Figure 1:
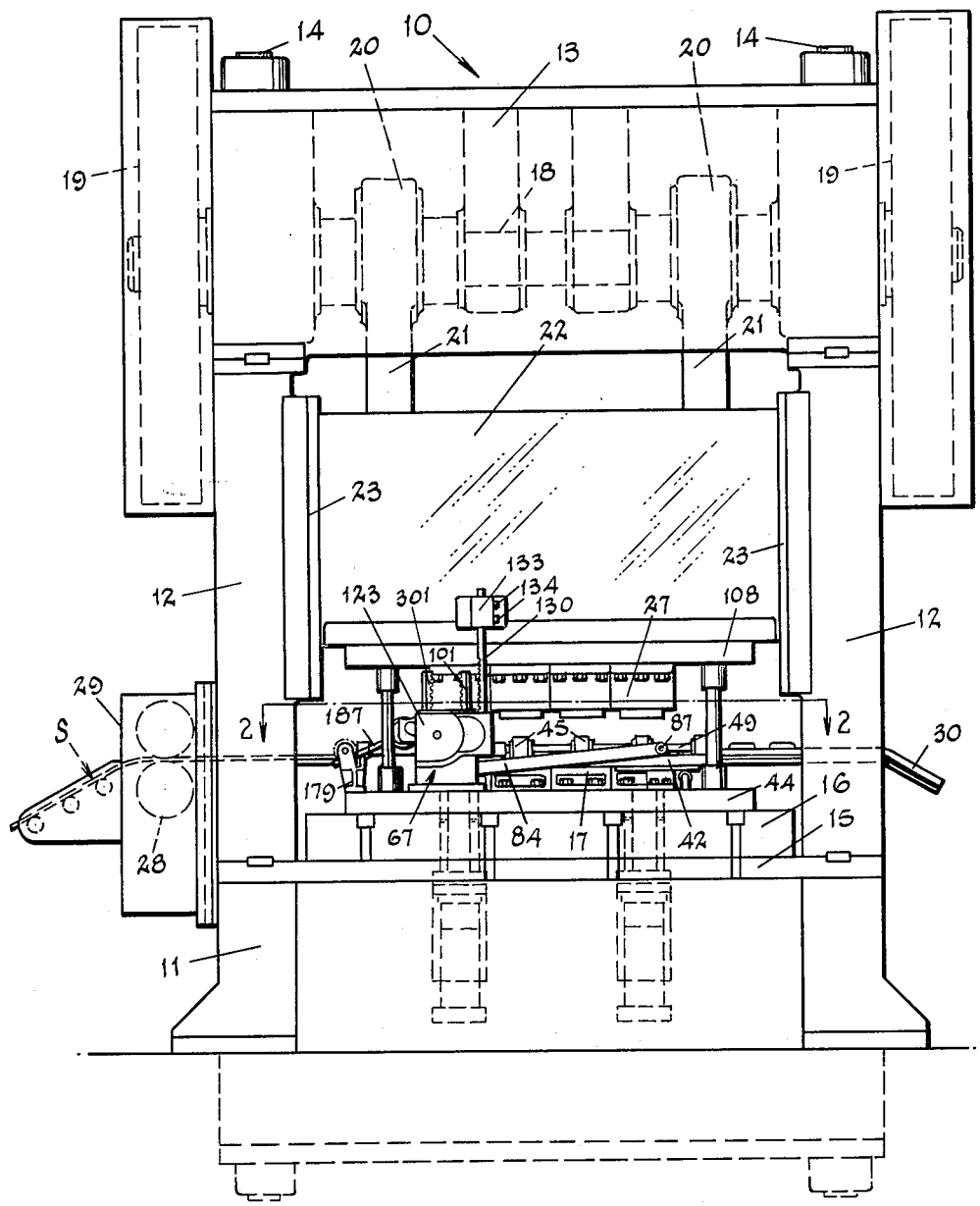

Oct. 9, 1962   M. R. HATCH   3,057,312
WORK FEED AND DRIVE THEREFOR
Filed May 21, 1958   7 Sheets-Sheet 1

INVENTOR.
Meredith R. Hatch
BY
ATTORNEY

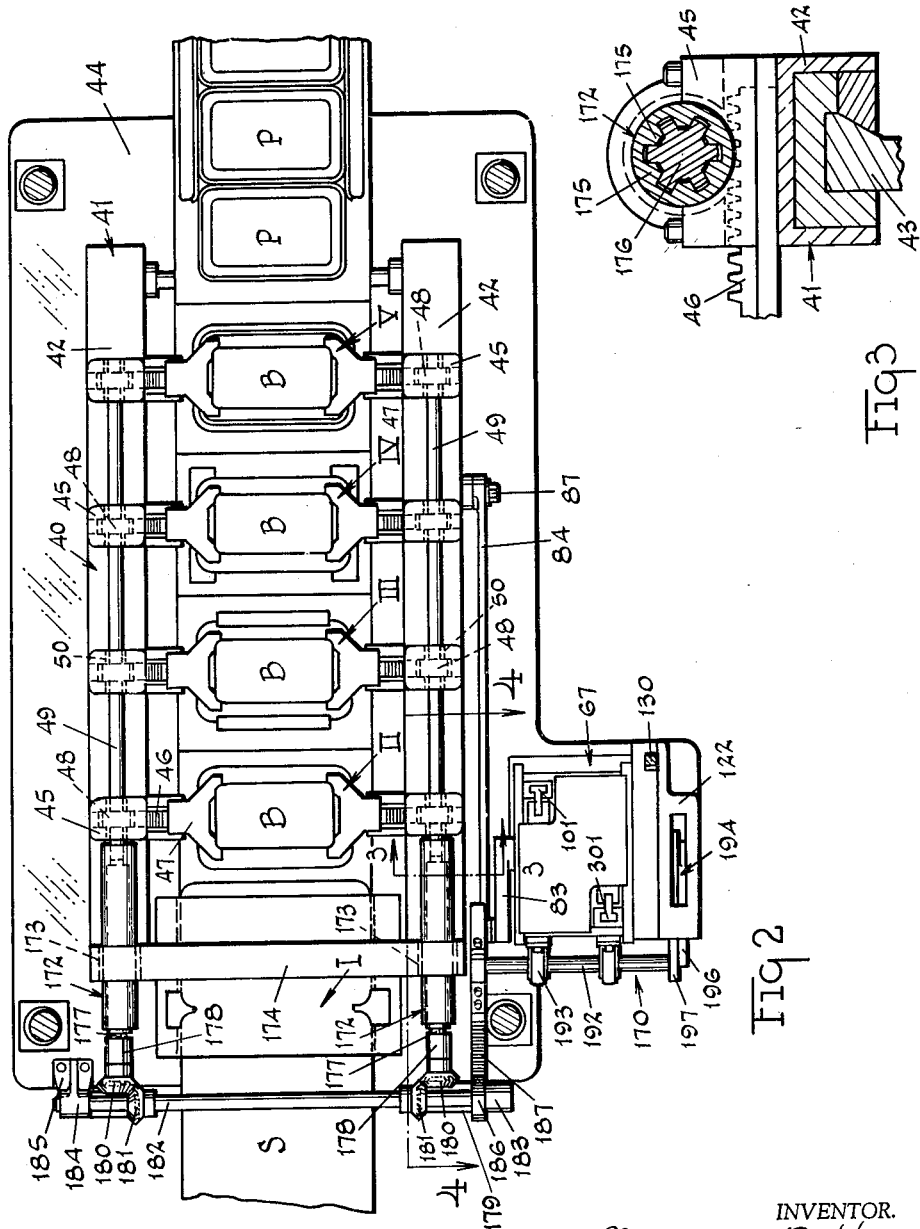

Oct. 9, 1962   M. R. HATCH   3,057,312
WORK FEED AND DRIVE THEREFOR
Filed May 21, 1958   7 Sheets-Sheet 3

INVENTOR.
Meredith R. Hatch
BY
ATTORNEY

Oct. 9, 1962 M. R. HATCH 3,057,312
WORK FEED AND DRIVE THEREFOR
Filed May 21, 1958 7 Sheets-Sheet 4

INVENTOR.
Meredith R. Hatch
BY
ATTORNEY

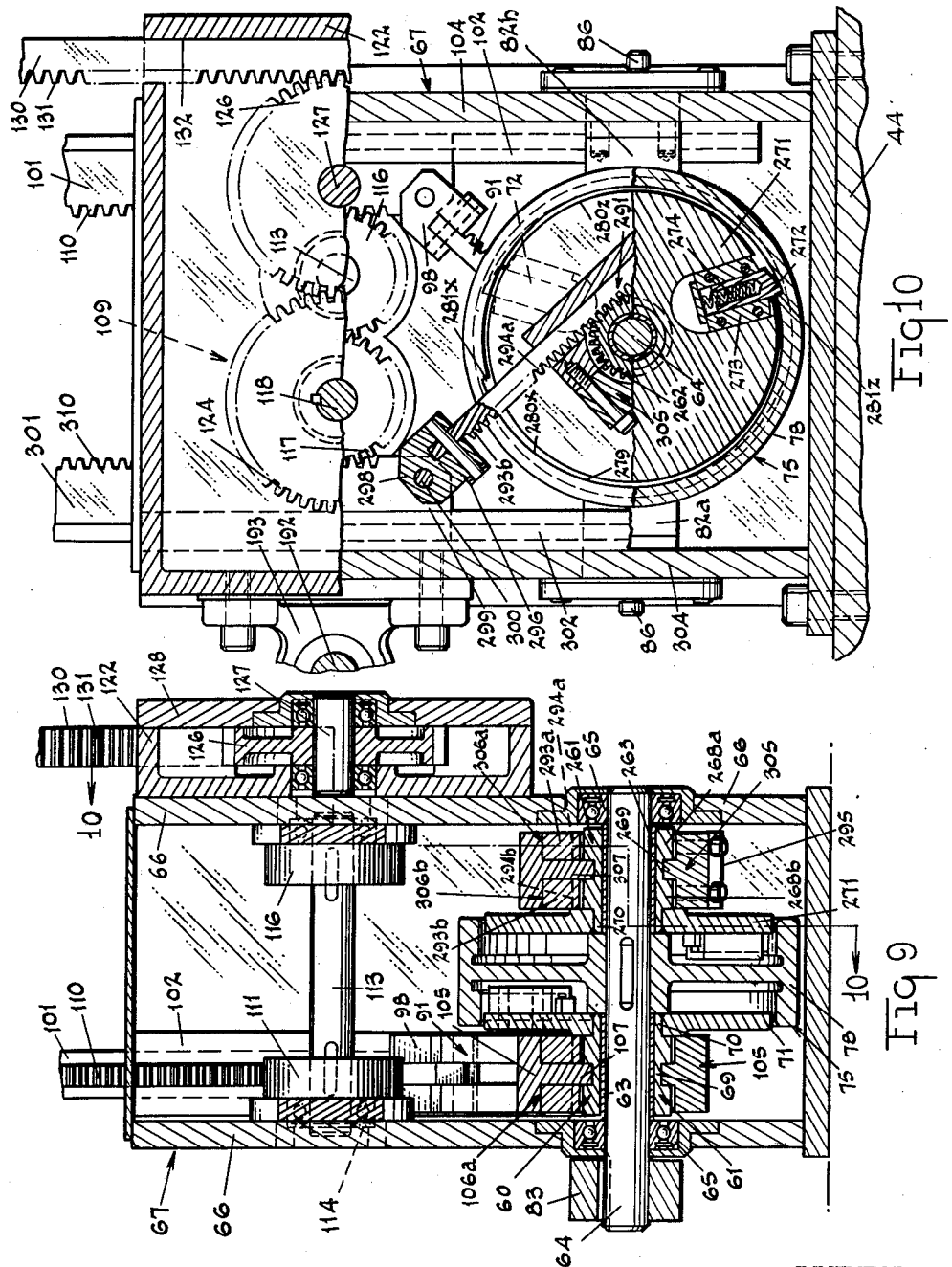

Oct. 9, 1962   M. R. HATCH   3,057,312
WORK FEED AND DRIVE THEREFOR
Filed May 21, 1958   7 Sheets-Sheet 6
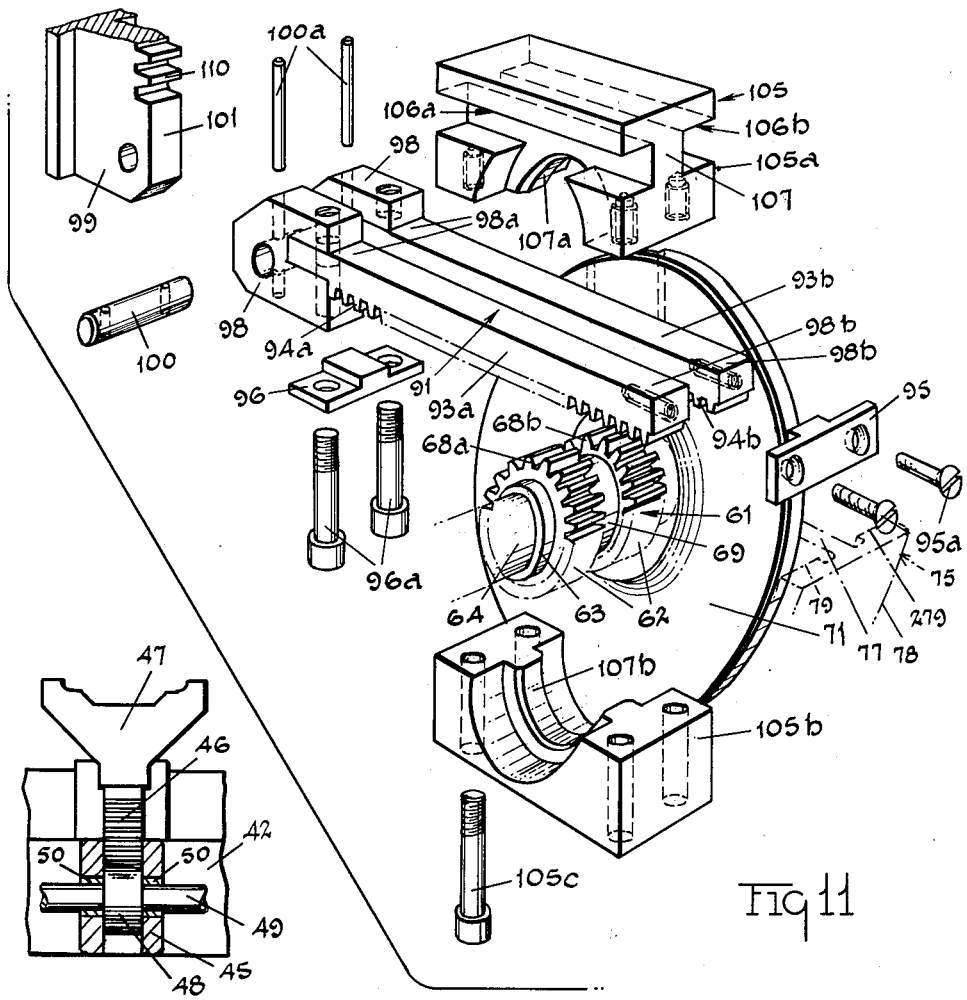
Fig 11
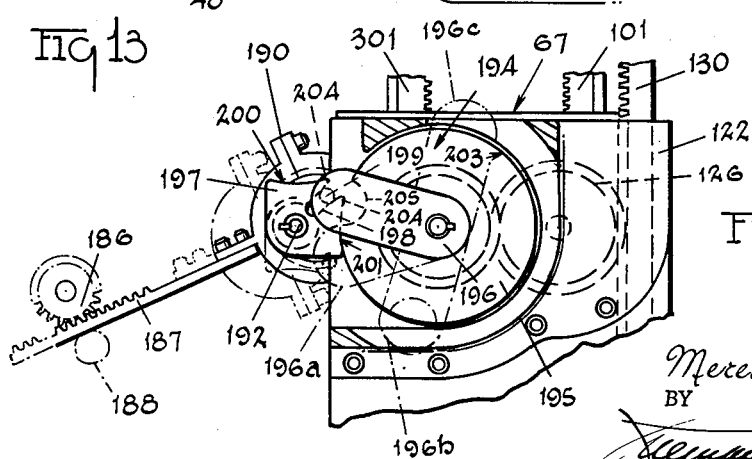
Fig 13
Fig 12
INVENTOR.
Meredith R. Hatch
BY
ATTORNEY Oct. 9, 1962 — M. R. HATCH — 3,057,312
WORK FEED AND DRIVE THEREFOR
Filed May 21, 1958 — 7 Sheets-Sheet 7
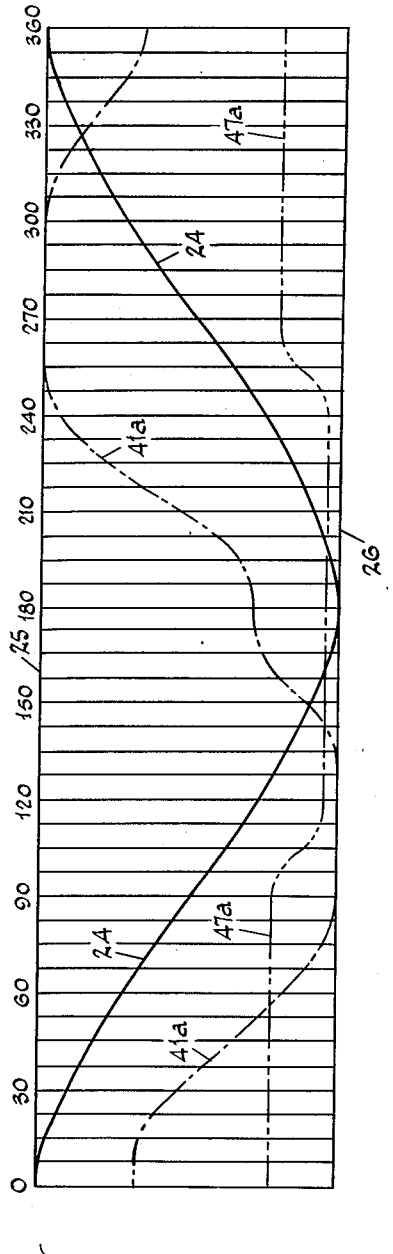
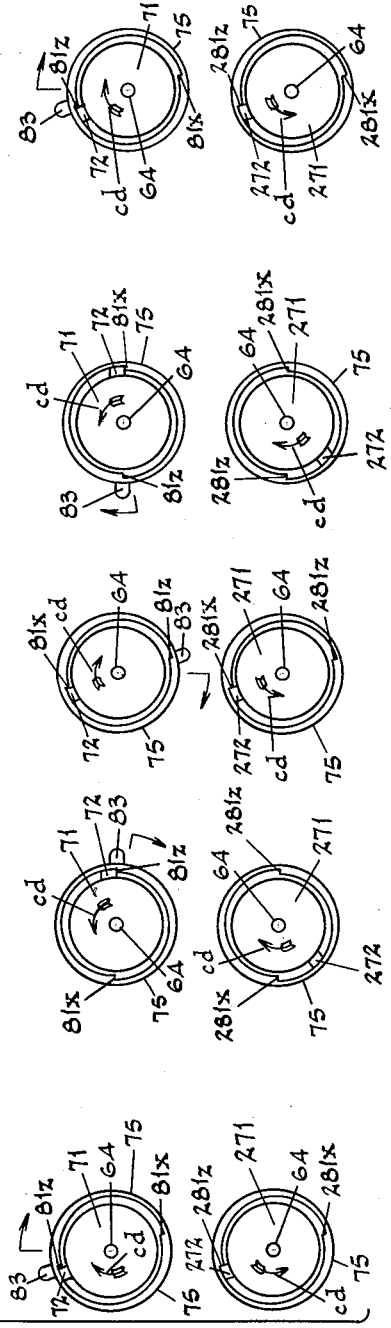
Fig14
INVENTOR.
Meredith R. Hatch
ATTORNEY United States Patent Office 3,057,312
Patented Oct. 9, 1962

3,057,312
WORK FEED AND DRIVE THEREFOR
Meredith R. Hatch, 2511 Berdan Ave., Toledo, Ohio
Filed May 21, 1958, Ser. No. 736,758
30 Claims. (Cl. 113—38)

My invention relates to a means for feeding work to a machine, such as a sheet metal press, in which an operation, such as a cutting, drawing or shaping, is performed on the work. In addition, by invention is concerned with a means for driving a work feeding means in synchrony with and as a consequence of the movement of a movable of the relatively movable operation performing components of such a machine.

My invention, in summary, so far as it concerns a work feeding means drive, resides in an arrangement of means and elements, including those elements comprising said means, whereby the motion and force exerted by a movable component of the relatively movable, operation performing components of a machine for operating on materials are utilized to drive a means for feeding work to the machine with a positive motion and periodic dwells that are in proper and desirable synchrony with the operations of the machine components on said work, the arrangement being compact, simple and of low installation and maintenance cost and of a ready adaptability to a variety of types and sizes of machines.

In so far as my invention concerns a work feeding means per se, it resides, in summary, in an arragement by which work engaging fingers of a work feeding frame are moved to engage the work for feeding and held in such engagement by a positive action means.

My invention has for one of its main objects to provide a work feeding means drive. Another of the objects of my invention is to provide such a drive wherein the transmission of power and the desired advance of the work and its dwell in operating or discharging positions is obtained exclusively through a train of gears and links, as distinct from a transmission having cam bodies, belts or like devices in the train. By this provision, my invention provides a work feeding means drive of positive action and at comparatively low cost.

Still another object of my invention in this connection is to provide a work feeding means drive of such simplicity in parts and arrangement as to occupy only a small space and thus lending itself to being included with a die set to form therewith a "package" unit, that may be easily and quickly installed on and removed from a die operating machine. Such package unit will be most useful, as when a sheet metal press is to be changed over from one type operation to another to operate multiple forming dies in a progressive forming operation and a work blank feeding means and a drive therefor is required to assure a synchrony of said work blank feeding means movement with the action of the press. By having the feed drive combined with the die set, as my invention makes practicable, the adjustment to assure desired synchrony feeding action and die position may be effected before the package is installed on the press and thus the shut-down time on the press to effect installation and synchronization may be greatly reduced.

Still another object of my invention in this same connection is to provide a work feeding means drive that receives its actuating power direct from the movable of the operation performing components of the machine, such as from a movable plunger component of a sheet metal press. Thus, a drive embodying my invention is not only actuated in exact synchrony with the movable operation performing component's movement but also the drive may be readily used in association with machines whose work operation components are actuated by various means, such as those driven by hydraulic means, by crank means or by cam means. Also by reason of this feature, an embodiment of my invention may be interchanged freely between machines of these different types of actuation.

An important particular object of my invention in this connection is to provide a work blank feeding means drive of a positive type for first moving a movable work blank engaging member of said work blank feeding means a distance to advance the work blank, such as a distance required to bring the work blank in registry with a die, and then and there to dwell a period allowing the work blank to be deposited at the place of advancement, such as on the die, and thereafter to move in the opposite direction to withdraw a distance, such as a distance required to enable seizure of a fresh work blank, and then and there again to dwell to enable work blank engagement preparatory to an advance and repetition of the described cycle.

Another one of the main objects of my invention is to provide, in a work feed, a work blank engaging means that is moved to engage the work blank and, when moved, is held with a constant and positive force in work blank engaging position.

In this same connection, another particular object of my invention is to provide a simple mechanical means for advancing and retracting work blank engaging fingers in a transfer feed mechanism. Still another particular object is to relate such mechanical means to the drive means heretofore mentioned that the advance and retraction of work blank engaging fingers occurs in synchrony with the operation of the material forming components of a material forming machine on which said blank engaging fingers may be mounted.

My invention has for further object those of providing other advantageous structures and arrangements which will appear from the following description and from an examination of the accompanying drawings. Work feeds and drives therefor containing my invention may take various forms, one of which, now appearing to me to be the best mode of carrying out my invention, is described hereinafter and is shown in the accompanying drawings. In making such description and in alluding to the drawings during the course thereof, I do not imply that I am unaware that there are variations from the structures described or shown which also embody my invention nor do I disclaim such variations as beyond the contemplation of my invention made manifest herein.

FIG. 1 of the accompanying drawings illustrates a view of a front elevation of a sheet metal press on which a work feed and drive therefor embodying the features of my invention is shown installed.

FIG. 2 of the drawings illustrates an enlarged plan view of a die set in the sheet metal press shown in FIG. 1, such die set being viewed from the plane of the line 2—2 indicated in FIG. 1 the feed means frame member being shown, however, at the opposite end of its stroke from that shown in FIG. 1.

FIG. 3 of the accompanying drawings illustrates an enlarged view of parts of the feed means drive by which the die set shown in FIG. 2 is served, said parts being viewed in section as taken on the plane of the line 3—3 indicated in FIG. 2.

Figures 4, 5:
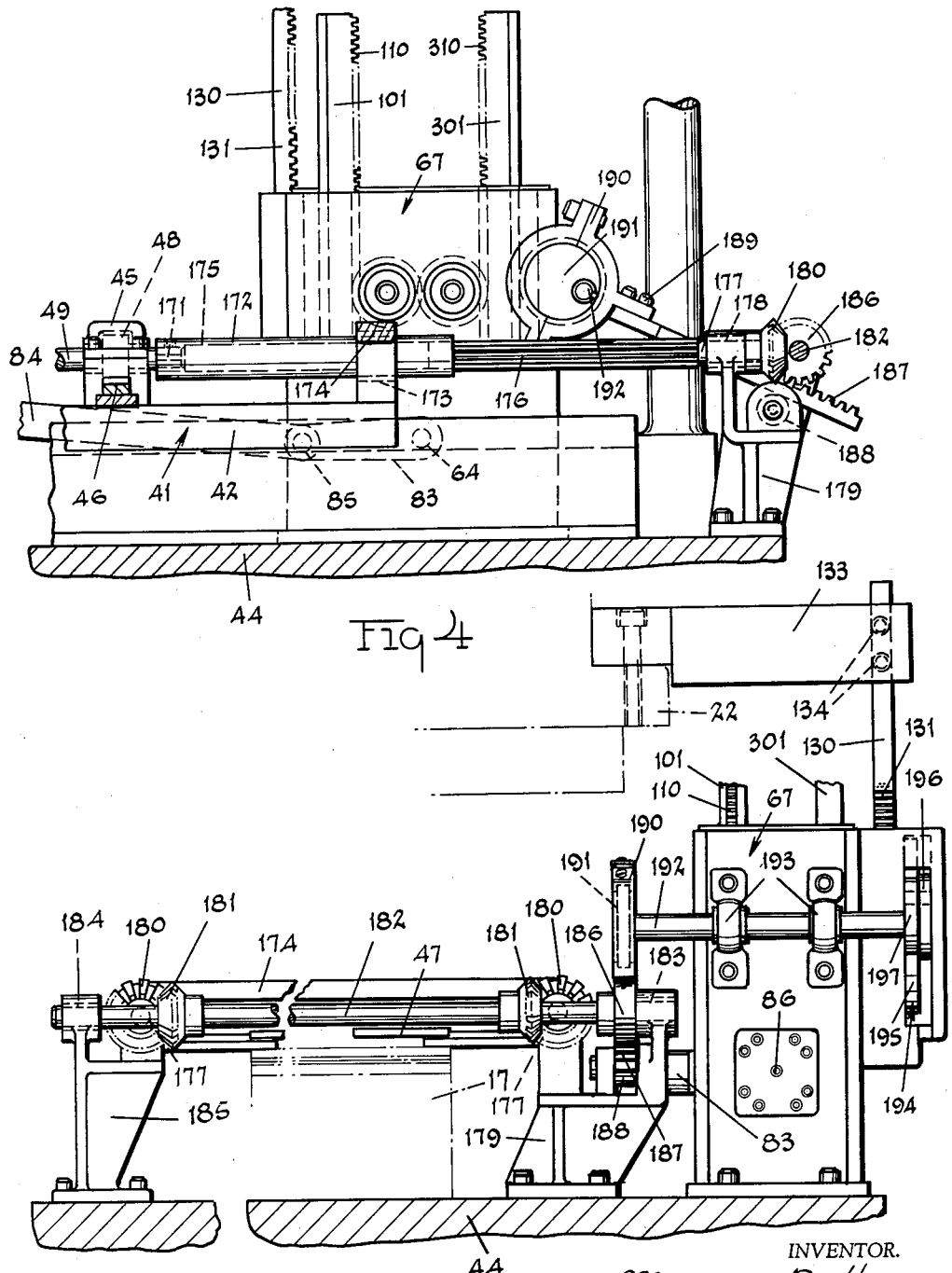

FIG. 4 of the drawings illustrates an enlarged side view, in elevation, of the feed drive, the view being taken along the line 4—4 shown in FIG. 2 but showing the feed means frame member at the same end of its stroke as that at which said frame member is shown in FIG. 1 of the accompanying drawings.

FIG. 5 of the accompanying drawings is an end elevation view of the feed drive shown in FIG. 4.

Figure 6:
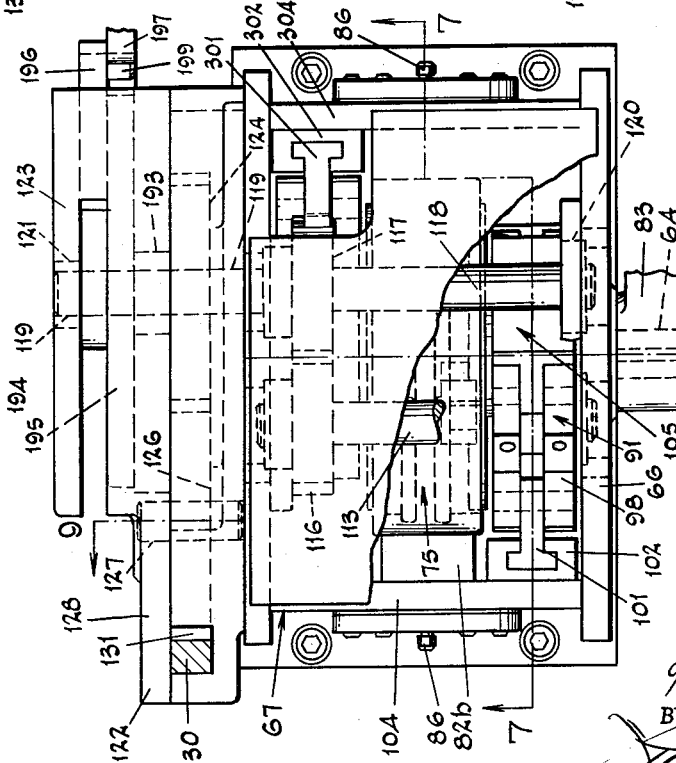

FIG 6 of the drawings illustrates an enlarged top plan view of the feed drive shown installed on the sheet metal press of FIG. 1, certain walls of the housing being shown broken away to better illustrate the enclosed parts.

Figure 7:
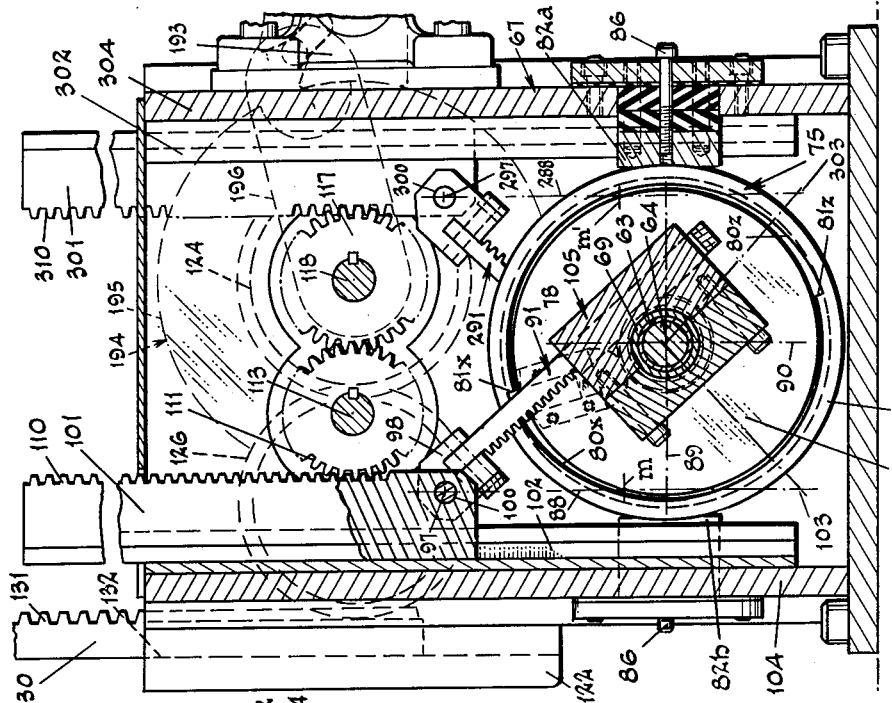

FIG. 7 of the accompanying drawings is a sectional view, in elevation, of the feed drive as taken on the plane of the line 7—7 indicated in FIG. 6.

Figure 8:
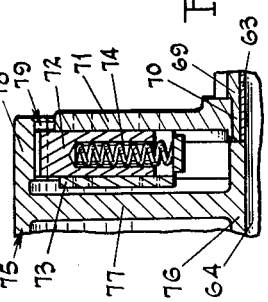

FIG. 8 of the drawings is a fragmentary detail view in section of a latch part on one of the clutch elements in the feed drive shown in FIGS. 6 and 7.

FIG. 9 of the accompanying drawings shows a view of an elevation, in section, as viewed on the plane of the stepped line 9—9 indicated in FIG. 6.

FIG. 10 of the drawings is a view in elevation of a section taken on the plane of the stepped line 10—10 indicated in FIG. 9.

FIG. 11 of the drawings is an enlarged exploded perspective view of certain primary parts of the feed drive shown in FIG. 10.

FIG. 12 of the accompanying drawings illustrates somewhat diagrammatically various driving and operating positions of the parts shown in FIG. 4.

FIG. 13 of the accompanying drawings illustrates an enlarged view, partially in section, of a work blank engaging finger on the feed means frame member shown in FIG. 2.

FIG. 14 of the drawings is a motion diagram showing the sequence and the synchrony of operation and positions of the movable plunger component of the sheet metal press shown in FIG. 1; the movable work engaging and moving feed frame, when driven by the feed drive described herein, and the movement of the work engaging fingers during a cycle and part of a successive cycle in the press plunger movement, with somewhat diagrammatic sketches showing the successive positions which certain parts of the feed drive described herein take in the mentioned sequence, disposed substantially in vertical aligned relation to approximate places on the motion diagram at which such parts take the position illustrated in the sketches.

The embodiment of my invention illustrated in the drawings and hereinafter described operates in conjunction with a mechanically driven, crank operated sheet metal press 10. However, embodiments of my invention are not necessarily dependent for their operation upon being associated with a sheet metal press or a machine that is operated by a mechanically driven means but will function to equal advantage with machines performing other operations than those preformed by presses or driven by other mechanical means than a crank or even by hydraulic means. In fact, one of the practical features of my invention is the adaptability of its embodiments to cooperate with machines for operating on various materials, for various purposes and actuated by various type drives.

In addition, the embodiment of my invention selected to illustrate what now appears to be the best mode by which my invention may be carried out is shown in the drawings and described herein in conjunction with a straight line, reciprocating transfer feed 40. Those skilled in the art will recognize, as the description proceeds, that my invention may be used to equal advantage with various type feeds, rotary as well as straight line, and indexing, as well as reciprocating types.

My invention is largely concerned with providing a drive means, generally indicated at 60, for driving both a work feed and the word blank engaging fingers thereof, said means being operated by and in synchrony with the movement of the movable of the relatively movable material operating component of the material operating machine, as said component moves to operate upon the work. In order that the utility of my invention may be made apparent, the sheet metal press 10 and transfer feed 40 shown in the drawings is first described.

The Sheet Metal Press 10

A base 11 from opposite ends of which uprights 12 extend upwardly to support a crown 13 form the frame of the sheet metal press 10. The base 11 and crown 13 are suitably connected together by the usual tensioned tie rods 14, extending through the uprights 12.

The base 11 of the press 10 provides a suitable bed component 15 for the sheet metal press 10 between the uprights 12. The bed component 15 is adapted to support a conventional bolster 16 on which a set of suitable metal cutting or shaping dies 17 may be supported. The crown 13 has suitable bearings for supporting a press drive shaft 18 for rotation in the crown. The drive shaft 18 may mount main gears 19 and be connected to a suitable source of power by some conventional means (not shown), such as the clutch illustrated and described in United States Letters Patent No. 2,009,301. The drive shaft 18 has crank arms 20 which, through suitable pitmans 21, are connected to a press gate or plunger component 22 of the sheet metal press 10.

The plunger component 22 is slidably mounted in ways 23 on the uprights 12 of the press frame so that, when the drive shaft 18 rotates, the plunger 22 will be caused to reciprocate through a stroke toward and then away from the bed 15 and the dies 17 mounted on the bolster 16. The stroke of the plunger 22 is diagrammatically illustrated in FIG. 14 of the accompanying drawings. There, a line 24, following the profile of a true sine wave, shows, in the degrees of rotation of the shaft 18 marked along scale 25, the approach and withdrawal of the plunger 22 relative to the bed 15, whose position is diagrammatically indicated as being in the plane of reference line 26. The plunger 22 carries a set of dies 27 which mate and cooperate with dies 17 on the bed supported bolster 16 to cut or shape work blanks placed between the plunger and bed components of the press 10.

The dies 17 and 27 illustrate in the drawings comprise matched female and male sets of dies by which progressive work in cutting or shaping may be performed by such successive pair of dies beginning, for example, with the pair on the left most side of the bed, as viewed in FIG. 2 of the accompanying drawing, and proceeding to the pair on the right most side of the press bed, also as viewed in FFIG. 2 of the drawings. Thus, in forming a pan like the one marked P in the drawings, the cooperating dies 17 and 27 at a first station I, receiving metal stock S in strip form through the agency of feed rollers 28 of a typical roll feed 29, may notch the strip edge; the cooperating dies 17 and 27 at the next succeeding station II may cut the strips to form a blank B and preform the blank B to dish shape; at station III, next in line, the dies there trim the sides of the blank B; at station IV, the dies trim the blank ends; and at station V, the last in line, they may form the edge flange and restrike the blank B to finish the pan P. Stations I to V, in the illustrated structure, are arranged in sequence along a line extending left to right across the bed 15 of the press 10. Thus, the metal stock S entering one side of the press 10 becomes first a work blank B and when it leaves from the opposite side, becomes the finished pan P, discharged on a chute 30 conveniently provided to convey the finished pans from the machine.

The movement of the work blank B from station to station and finally to be discharged onto chute 30 is effected by a mechanism designated as the transfer feed 40 which I shall now describe.

The Transfer Feed 40

The mechanism shown in the accompanying drawing for transferring and feeding work, such as the work blank marked B comprises, in the main, a frame member 41 having side bars 42 mounted for reciprocation on and along parallel tracks 43 on a bed plate 44 of the die set 17. The tracks 43 extend across the bed plate 44 on opposite sides of the mentioned dies at stations I and V inclusive. At points along the length of each side bar 42 spaced from each other distances equal to the distances between the die stations and opposite to corresponding points on the other side bar 42 are mounted a plurality of heads 45. Each head 45 slidably supports a rack 46 that is movable of its respective head toward and away from the opposite side bar 42. Each rack 46 has work engaging fingers 47 at its free end. Each rack 46 meshes with a pinion 48 rotatably mounted in each head 45. When the pinions 48 in the heads 45 are rotated in one direction all the racks 46 are run out from their respective heads 45 toward the opposite side bar 42. This moves the fingers 47 on the ends of the racks 46 to engage a work blank B between them. Now, if the frame 41 were to be moved along the tracks 43, the fingers 47 would support and also move the work blanks B engaged by said fingers. When the pinions 48 are rotated in the other direction, the racks 46 are run inwardly of their respective heads 45. This moves the fingers 47 to disengage the theretofore engaged work blanks B.

Desirably all the pinions 48 are rotated to coincidentally move their respective racks 46 in or out at the same time and in synchrony with the reciprocation of the plunger 22 and the reciprocation of the feed frame member 41. Such rotation of the pinions 48 is effected by shafts 49. There are preferably two shafts 49. Each shaft is supported by bearings 50 in each of the heads 45 on one of the side bars 42 of the frame member 41 for rotative movement. The pinions 48 are supported at spaced points along the length of shaft 49 so as to mesh with the racks 46 and so that when the shaft 49 rotates in one direction, all the pinions 48 are caused to rotate in the same direction. By moving both shafts 49 at the same time, coincidental rotation of the respective pinions 48 occurs and the fingers 47 are moved coincidentally and cooperatively to engage or disengage work blanks B. A means 170 by which the shafts 49 are thus rotated to produce common rotation of pinions 48 in synchrony with the movement of the frame 41 and the plunger 22 is a part of my invention and therefore will be described herein, after considering the drive means 60 for driving the feed means 40.

*The Feed Drive Means 60*

The feed means 40 is driven in response to the motion and force exerted by plunger component 22 of the sheet metal press 10 as it moves through its stroke relative to the bed 15. The drive means 60 by which such motion and force is transmitted to the feed 40 is positive in nature. Essential parts of said drive means 60 comprise part 61, whose rotation causes lineal movement of the feed means frame member 41, either forward or backward with respect to the stations I to V inclusive, and a part 91 that is moved by and with the plunger component 22 and engages the part 61 to rotate the same. By reason of said rotation of the part 61, the frame member 41 is moved or dwells to allow the fingers 47 to engage or disengage the work blanks B, all in synchrony with the stroke of the plunger 22.

In the embodiment shown in the accompanying drawings, the part 61 is a gear part and preferably of the form of a wheel or pinion and bearing peripheral teeth 62. The rotatable tooth bearing wheel part 61 is mounted for rotation on the sheet metal press 10 by a sleeve 63 journaled on and rotatable relative to a shaft 64. The shaft 64 is rotatably supported by bearings 65 in opposite side walls 66 of a housing 67 for enclosing the drive 60. The housing 67 is supported on the bed plate 44 of the die set 17. Preferably, for reasons that will later appear, the part 61 has a spool-like shape with its teeth 62 in two sets of teeth 68a and 68b. These sets of teeth are in axially spaced relation to each other and at opposite ends of a cylindrical hub 69. The hub 69 has a projection 70 extending axially beyond the 68b set of teeth. A wheel 71 is fixed on said projection 70 and is thus united with and coaxial to the part 61.

The wheel 71 shown in the drawings comprises one element of a clutch combination. The wheel has a latch 72 supported in bearing 73 on the clutch wheel element 71 for slidable movement in a direction generally radially of said clutch element wheel 71 from and to a position in which the latch 72 extends beyond the periphery of the clutch element wheel 71 to and from a position in which the latch 72 is within said periphery. Preferably, a spring 74 bearing on the latch 72 and the wheel or bearing 73 is provided to bias the latch 72 toward a position in which the latch 72 extends beyond the periphery of wheel 71. The clutch element wheel 71 is adapted to cooperate with a second clutch element embodied in a flanged wheel 75.

The flanged wheel 75 has a hub 76 mounted on and keyed to shaft 64. Extending radially from the hub 76, the wheel 75 has a web 77 which at its outer edge supports a rim 78. The rim 78 extends axially from one side of the web 77 to provide a flange on said side of the web 77. The disposition of the wheel 75 relative to the wheel 71 is such that the wheel 71 is enclosed by the rim 78 on one side of the web 77 and, in a sense, the wheel 71 nests with the wheel 75. Thus, the latch 72 on the clutch wheel 71 is urged by spring 74 (see FIG. 8 of the accompanying drawings) to engage an inner surface 79 of the rim 78. In the event the wheel 71 rotates relative to the wheel 75, the latch 72 will ride on and over the surface 79.

In order that the wheels 71 and 75 may be operatively connected and to provide a bearing on which the spring urged latch 72 may slide when relative rotation occurs between said wheels, the surface 79 of the rim 78 is machined to provide a pair of arcuate tracks 80x and 80z. The tracks 80x and 80z, as shown in FIG. 7 of the accompanying drawings, originate at diametrically opposite points on the inner surface 79 and extend one hundred and eighty degrees around the axis of rotation of the wheel 75, each in an arcuate path generally eccentric to the axis of rotation of the wheel to a point that coincides angularly with the point at which the other of said tracks originated. At the point where each track 80x and 80z ends and its companion track begins, radial steps or cogs 81x and 81z will be formed. If the clutch wheel 71 be rotated relative to wheel 75 in a direction moving the latch 72 toward a position against a cog, the latch 72, after allowing the wheels 71 and 75 to rotate relative each other, something never in excess of one hundred and eighty degrees, will engage one of the cogs 81x or 81z on the clutch wheel element 75. Such relative movement of the clutch wheels 71 and 75 in a direction toward latch and cog engagement which is never more than a movement of one hundred and eighty degrees is hereinafter sometimes called "clutch run." Continued rotation of the wheel 71 in the same direction will thereafter cause like rotation of the wheel 75. The condition just described is hereinafter sometimes called "clutch drive." However, should the wheel 71 rotate in the opposite direction, the latch 72 will move away from and disengage any engaged cog. Then, in consequence of being moved over the tracks 80x and 80z, the latch will be urged inwardly of its bearing 73 against the bias of the spring 74 and will clear or skip over the cogs with which the latch thereafter registers, without driving engagement thereof. Thus, in that instance, the wheel 71 may rotate without limitation independently of the wheel 75. Movement of that character is hereafter sometimes called "clutch back-run."

The clutch element wheels 71 and 75 and the shaft 64 constitute, with a crank 83 and a link 84, a means by which the rotatable wheel part 61 is operatively connected to the feed member frame 41. The crank 83 is keyed to the shaft 64 and by a wrist pin 85 is connected to one end of the link 84. The other end of the link 84 (see FIG. 2 of the accompanying drawings) is pivotally connected by a pin 87 to the frame 41. Thus, when wheel 75 rotates, the crank 83 will move link 84 causing the frame 41 to reciprocably move over its supporting tracks 43 to advance work blanks B to the die stations I to V. Preferably, means is provided that exerts yielding restraint on the wheel 75 and thus on the shaft 64, whereby rotation of the shaft is made to occur only when driven to rotate through the concurrent rotation of the clutch wheels 71 and 75 in the same direction. In the structure shown in FIG. 7 of the accompanying drawings, such means is embodied in a pair of brake shoes 82a and 82b that are suitably supported on the housing 67 to engage the outer surface of the rim 78 of wheel 75. Adjustment of the pressure exerted by the brake shoes may be effected by bolts 86.

Rotation of the wheel 75 depends upon rotation of the part 61 in direction that will cause enclutchment between the clutch element wheels 71 and 75. Rotation of the part 61 is effected by the other mentioned essential part 91 which shall now be described.

Fundamentally, the part 91 is a gear part and, in the embodiment best shown in FIG. 11 of the accompanying drawings, is a double rack part. The rack part 91 has two parallel bars 93a and 93b of teeth 94a and 94b. The bars 93a and 93b are connected at their ends 98a and 98b by spacers 95 and 96 which are bolted to bars 93a and 93b by suitable bolts 95a and 96a respectively. Spacer 96 at end 98a has bifurcations 98 which mesh, clevis-wise, with and, by pin 100, are pivotally connected to the lower end 99 of a slide bar 101. The slide bar 101 slidably engages and, as shown in FIG. 7 of the accompanying drawings, is guided by bearings 102 on an end wall 104 of the housing 67.

The bearings 102 restrict the movement of the slide bar 101 to one in which the end 99 of the slide bar 101 and the rack end 98a connected by pin 100 thereto move along a straight line path, indicated by the broken line 88 shown in FIG. 7 of the accompanying drawings. The position of this path in relation to the axis of rotation of the part 61 is critical and determinative. As shown in the particular embodiment the path through which the rack end 98a moves intersects and it preferably bears a right angular relation to a horizontal plane, indicated by broken line 89 on FIG. 7, that is angularly normal and diametric to the part 61. In addition the path indicated by line 88 is on one side of and spaced a distance less than the length of one of the rack bars 93a and 93b from a vertical plane, indicated by the broken line 90 in FIG. 7, that, like the horizontal plane indicated by line 89, is angularly normal and diametric to the part 61 and is angularly normal to said horizontal plane, indicated by broken line 89. As will be seen from FIG. 7 of the drawings, the path along line 88, in the structure illustrated, extends from a starting and ending point 97, above the horizontal plane indicated by line 89, to a returning point 103 on the line 88, below said horizontal plane, a distance, in the illustrated structure of six inches.

In order to support the part 91 in an operative meshing relation with the part 61, a means, shown best in FIG. 11 of the accompanying drawings, in a stirrup block 105 is provided. The block 105 may be formed by two portions 105a and 105b secured together about the hub 69 of the part 61 by suitable bolts 105c. The block 105 has bearing surfaces 106a and 106b for slidably supporting the bars 93a and 93b of the rack part 91. The block portion 105a and 105b preferably each have a web 107 that extends between the bars of the rack part 91 and provides bearing surfaces 107a and 107b that engage and encircle the surface of the hub 69. Thus, the block 105 holds the rack bars of the part 91 in mesh with the part 61, without limiting the freedom of the rack part 91 to tilt or move endwise relative to the axis of rotation of the part 61. As slide bar 101 reciprocates in its bearings 102, it may, through the connection of its end 99 and the rack end 98a, freely move the rack end 98a along the vertical path 88 heretofore described and relative to the axis of rotation of the part 61.

This movement of the rack end 98a causes the rack part 91 to move tiltingly relative to the axis of rotation of the part 61 and, in certain phases of the rack end movement, causes the rack part 91 to also move endwise across said axis of rotation. When the rack part 91 moves endwise, its teeth 94a and 94b engage teeth 68a and 68b on the part 61 in gear action, causing rotation of the part 61. When the rack part 91 moves tiltingly, the rack teeth 94a and 94b, instead of engaging the teeth 68a and 68b of the part 61 in gear action, tend to "walk around" the teeth 68a and 68b of part 61. The rack movement most of the time is a combination of endwise and tilting movement. The gear action between the teeth 68a, 68b and 94a and 94b of the parts 61 and 91 vary so far as such action tends to rotate the part 61, by producing increased rotation of part 61 per increment of movement of the rack end 98a along its path along line 88 when the endwise movement of the rack part 91 produces rotation of the part 61 in the same direction about its axis of rotation as that in which tilting movement of the rack part 91 occurs. Decreased rotation of the part 61 is produced on the other hand, when the endwise movement of the rack part 91 produces rotation of the part 61 in the opposite direction to that in which the tilting movement of the rack part 91 occurs. When the rack part movement is exclusively a tilting movement which it is only at certain phases of the movement of the rack end 98a, there is no gear action between the teeth of the rack part 91 and part 61 and, consequently, the part 61 dwells.

Assuming the rack end 98a of the rack part 91 be at point 97 on the path 88 and the movement of the rack end be toward the point 103 on said path such movement will be a downward movement, as viewed in FIG. 7 of the accompanying drawings. As the rack end 98a moves from point 97, the rack part 91 will move endwise and tiltingly relative to the axis of rotation of the wheel part 61, such tilting movement of the rack part 91 being in a direction about the axis of rotation of the part 61 that is opposite to the direction of rotation of part 61 produced by the endwise movement of the rack part. When, the rack end 98a in its movement approaches a point, indicated m on the path line 88, which point is spaced from the horizontal plane indicated by line 89 a distance substantially equal to the pitch radius of the part 61, the movement of the rack part 91 changes from a combined endwise and tilting movement and becomes a movement that is exclusively tilting. This exclusive tilting movement continues as the end 98a of the rack part 91 continues moving along its path 88 until the rack end 98a passes a point at which the path 88 intersects the horizontal plane indicated by line 89. At this point, the rack part 91 begins again moving in a combined tilting and endwise movement, the endwise movement being now in an opposite direction to the endwise movement that took place while the rack end 98a was moving from point 97 toward plane 89. Since the endwise movement of the rack part in this phase produces rotation of the part 61 in the same direction in which the rack part 91 is tilting about the axis of rotation of the part 61 in this phase, the rotation of the part 61 increases in relation to the increments of movement of the rack part end 98a.

This combined tilting and endwise movement of the rack part 91 continues until the rack end 98a reaches point 103 on the path 88. At point 103, the direction of movement of the rack end along its path is reversed from a movement in a downward direction, as viewed in FIG. 7 of the accompanying drawings, and becomes a movement in an upward direction returning to point 97. As the rack end begins its return passage from point 103 to point 97, the rack part 91 is moved tiltingly and endwise, but now in the opposite direction from that in which the rack part moved during the stage the rack end 98a was passing toward point 103 from the point at which the plane 89 intersects the path 88. This combined endwise and tilting movement of the rack part 91 produces decreased rotation of the part 61 per increment of movement of the rack end 98a and continues until the rack end again passes through the plane 89. At this point and as the rack end continues moving toward the point m, the movement of the rack part 91 is exclusively a tilting movement, with the consequence that the rack part walks around the part 61, in the opposite direction, however, from that in which the rack 91 walked around the part 61 when the rack end 98a was moving downwardly toward the point 103. During this phase, the part 61 dwells until after the rack end, in its continued movement along the path 88 toward the point 97, passes through point m on said path. The movement of the rack part 91 again becomes a combined tilting and endwise movement, the latter being in a direction opposite to the direction of endwise movement of the rack 91 during the period the rack end 98a was moving from the point 103 toward the plane 89 and producing rotation of the part 61 in the same direction about the axis of the part 61 as that in which the rack part 91 is being tiltingly moved. This combined endwise and tilting movement of the rack 91 continues, producing increased rotation of the part 61 per increment of movement of the rack end 98a, until the rack end reaches the point at which a horizontal line, the line 89, intersects the path 88. On continued movement of the rack end 98a along the path 88 and until the rack end reaches point m on the path, the rack 91 tilts, to the substantial exclusion of any endwise movement. As the rack end 98a passes through point m en route to point 97 at which the here described movement started, the rack resumes a combined tilting and endwise movement, the tilting continuing in the same direction as that while the rack end moved from point 103 to point m but the endwise movement being in the opposite direction. This produces opposite rotation of the part 61 to the direction of tilting of the rack part 91 and hence a decreased rotation of part 61 per increment of movement of the part 91.

So that the passage of the rack end 98a through its path 88 and the consequent phases of periodic combined endwise and tilting movement and exclusively tilting movement of the rack part 91 and the resultant movement and dwell of the part 61 will be effected and be in synchrony with the movement of the sheet metal press plunger 22, the slide bar 101 is operatively connected by a suitable means to the plunger 22. This connection may be a direct one, as by connecting the upper end of the bar 101 to the plunger, or an indirect one, as through a transmission like that provided by a change gear train 109 shown in the accompanying drawings. By using the change gear train 109, a means is provided for adapting the drive 60 to sheet metal presses, each having a stroke of a different length. To make connection with the gear train 109, the slide bar 101 has rack teeth 110 which mesh with a driven pinion 111 in said change gear train 109 shown best in FIG. 7 of the accompanying drawings.

The driven pinion 111 is mounted on and keyed to a counter shaft 113. The shaft 113 is borne by bearing 114 (see FIGS. 9 and 10 of the drawings) in the side walls 66 of the housing 67. A counter pinion 116 is also keyed to the shaft 113 and is positioned thereon to mesh with a second counter pinion 117. Counter pinion 117 is keyed to a second counter shaft 118 mounted in bearing 120 in side walls 66. Shaft 118 has an extension 119 which extends outwardly of the housing 67 and into a gear case 122 attached to one of the side walls 66 of the housing 67. The extension 119 of shaft 118 supports a change gear 124 that is keyed to the shaft extension 119 so to mesh with a main drive gear 126. The main drive gear 126 is mounted for rotation on a stub shaft 127 suitably journaled in a wall 128 of the gear case 122 and in one of the side walls 66 of the housing 67.

By substituting gears of different pitch diameter and tooth number for the gears 124 and 126, any desired operation of parts 61 and 91 may be obtained in timed relation with sheet metal presses having strokes of different length. The arrangement shown in the accompanying drawings is one that operates in conjunction with sheet metal press having a six inch stroke. The gears 124 and 126 illustrated in the drawings are intended to show those having a pitch diameter of four inches and mounting forty-eight teeth. To change the train 109 so that the arrangement may be operated in conjunction with for example a press having an eighteen inch stroke, the main drive gear required to replace the gear 126 would be one having a two inch pitch diameter carrying twenty-four teeth and a change gear required to replace change gear 124 would be one having a six inch pitch diameter carrying seventy-two teeth. Correspondingly, the change gear train 109 may be modified by substituting gears of other sizes for gears 124 and 126 so thus adapt the drive 60 to presses having strokes of different lengths.

In order that the change gear train 109 shall be actuated and, in turn, the slide bar 101 be moved to move the rack part 91, a pusher rod 130 is provided. The rod 130 has rack teeth 131 and is supported for vertical reciprocation with teeth 131 in mesh with main drive gear 126 by bearing surfaces 132 on the gear case 122. The upper end of the rod 130 is bolted in a clamp 133 by suitable bolts 134 which, as shown in FIG. 5 of the accompanying drawings, thereby suitably connects the rod 130 to the plunger component 22 of the sheet metal press 10. As the press plunger 22 reciprocates through its pressing stroke, the rod 130 will be reciprocated along its bearing surfaces 132, causing rotation of main drive gear 126 and reciprocation of the slide bar 101.

The gearing in the change gear train 109; the gear relation of the parts 61 and 91; and the clutch relation between the clutch elements 71 and 75 are all such that, as the plunger 22 starts its downward stroke (indicated diagrammatically on scale 25 of FIG. 14 as beginning at zero degrees in rotation of the drive shaft 18) the rack end 98a is caused to begin to move along its path. In consequence, the rack part 91 moves endwise in a direction to cause part 61 to rotate clutch element 71 so that the latch 72 engages a cog 81x or 81z on the element 75 to rotate the same and move the transfer feed member frame 41 forwardly a distance equal to the space between adjacent stations of the stations I to V, inclusive. This forward movement of the frame 41 from fully retracted to advanced positions is indicated diagrammatically along the scale 25 of FIG. 14 by the broken line 41a as it descends and approaches the base line 26 on said scale 25. Just before the plunger 22 reaches and passes through positions (indicated diagrammatically on scale 25 of FIG. 14 at approximately ninety seven degrees of rotation of the shaft 18) and before the plunger 22 engages the bed die set 17, the rack end 98a passes through point m in its path 88, causing the rack part 91 to discontinue its further endwise movement and to begin to tilt exclusively. This causes the rack part 91 to walk about the part 61 and allows the part 61 to dwell during the continued downward movement of the plunger 22. Correspondingly, the clutch elements 71 and 75 and shaft 64 dwell, allowing the feed member frame 41 to also dwell. The dwell of the feed member 41 and its duration is indicated diagrammatically along the scale 25 of FIG. 14 of the drawings by the portion of the line 41a that coincides with base line 26.

At this dwell interval, the pinions 48 are actuated to retract the racks 46 and blank holding fingers 47 allowing the work blanks B that were brought forward in the just described forward movement of the feed member frame 41 to settle into a die station, preparatory to the imminent closing of the press plunger on the bolster supported die set 17. The retracting movement of the fingers 47 is shown diagrammatically along the scale 25 of FIG. 14 of the accompanying drawings by the broken line 47a which, as it approaches the base line 26 of the scale 25, indicates an opening of the fingers 47 and, as it diverges from the base line 26, indicates a closing of the fingers 47.

As the plunger 22 begins a return stroke from a position of full closure (indicated diagrammatically by line 24 on the scale 25 in FIG. 14 at about the one hundred eighty degrees in rotation of shaft 18) the rack end 98a, in response to the motion imparted to the slide bar 101 through the rod 130 and change gear train 109, begins to move from point 103 along its path 88 toward the point at which said path intersects the plane 89. Movement of the rack end 98a in this stage causes endwise movement of the rack part 91. This movement of the rack part effects a rotation of the part 61 in a direction that causes the latch 72 to engage the clutch element 75, with a consequence rotation of shaft 64 and movement of transfer feed frame 41, backward, a distance equal to that between adjacent stations of the die stations I to V, inclusive. The backward movement of the transfer feed frame 41, indicated diagrammatically by line 41a on the scale 25 in FIG. 14 of the accompanying drawings, positions the fingers 47 for seizure of a fresh work blank B.

Before the plunger 22 reaches a position (see line 24 on scale 25 of FIG. 14 of the drawings) that completes its upward stroke, the rack end 98a passes through that portion of its path 88 between the point at which the path intersects the plane 89 and the point m on said path. During this phase of rack and movement, the rack part 91 discontinues endwise movement it was previously making and starts an exclusively tilting movement. This causes the rack part to walk about the part 61, with the consequence that the part 61 remains at rest despite the continued movement of plunger 22. The dwell of the part 61 allows the feed member frame 41 to dwell, as is diagrammatically indicated by line 41a in scale 25 of FIG. 14 of the drawings. Pinions 48 may be actuated to run out the finger 47 supporting racks 46 to engage fresh work blanks B preparatory to the later advance of the feed frame 41 during the period of the next downward stroke of the plunger component 22 and the start of another cycle in press operation.

It will have been observed that each dwell of the transfer feed member frame 41, after its forward or rearward movement begins at the time the plunger 22 is approaching mid downward or mid upward stroke. In part, each dwell is due to the described exclusive tilting movement of the rack 91 during each of these periods. The remainder of each dwell is due to the clutch run of the clutch element 71 relative to the clutch element 75. The total duration of each dwell is something excess of the period required by the plunger to make one-half a stroke. This arrangement, would require the movement of the transfer feed frame 41 to take place in a relatively short period during the movement of the plunger 22 and to do so would produce undesired jerky movements in the transfer feed frame 41.

In order that the forward and backward movement of the transfer feed frame 41 shall take place during a longer period in the plunger movement and therefore shall be a more gradual movement notwithstanding the distance the frame 41 may be obliged to move in making its stroke and particularly so that the starting of the frame member 41 at the beginning of each stroke shall be more gradual and with minimum jerk, a second driving connection of the kind already described as including parts 61 and 91 is provided. This second driving connection includes a part 261 and a cooperating part 291 which together establish a connection between the clutch element 75 and the plunger component 22. The parts 261 and 291 are analogues to parts 61 and 91 and are designed to alternate therewith in driving the clutch element 75 and thus the shaft 64 to move the feed frame member 41 relative to the die stations I to V inclusive.

As shown in the accompanying drawings, the part 261 is a gear having teeth 262. The part 261 is supported for rotation by a sleeve 263 journaled on the shaft 64 on the other side of the web 77 from that side on which the sleeve 63 is located. The sleeve 263 is freely rotatable relative to the shaft 64. Like part 61, the teeth 262 of the part 261 are arranged in two sets of teeth 268a and 268b disposed in axially spaced relation at opposite ends of a cylindrical hub 269. Preferably, the teeth 268a and 268b are equal in number to the teeth 68a and 68b and are arranged to have the same pitch diameter as that of teeth 68a and 68b. The hub 269 has an end projection 270 to which a second clutch element 271, a counterpart to the previous described clutch element 71, is suitably fixed in coaxial relation to the part 261 and the clutch element 75.

The clutch element 271 supports a latch 272 in a bearing 273 on said clutch element. The latch 272, like latch 72 is movable radially of its supporting element from and to a position in which one end of the latch 272 extends beyond the periphery of the element 271 and to and from a position in which the latch end is within said periphery. A spring 274 bears on the latch 272 and biases it so that one end of the latch tends to extend beyond the periphery of the element 271. Like the clutch element 71, the clutch element 271 is adapted to cooperate with the clutch element 75. Accordingly, the clutch element 271 is disposed so that it nests with the rim 78 of the clutch element 75 on the opposite side of the web 77 as that on which the clutch element wheel 72 is disposed. Thus, the latch 272 will be urged by spring 274 to engage an inner surface 279 of the rim 78 of the clutch element 75. The surface 279, like surface 79 of the clutch element 75, is machined to provide a pair of arcuate tracks 280x and 280z. The tracks 280x and 280z each originate at a point, angularly speaking with respect to the axis of rotation of the element 75, that is, for reasons that will be later explained, approximately minus 1 degree to the point at which each of the axial corresponding tracks 80x and 80z originate. The tracks 280x and 280z extend one hundred eighty degrees around the axis of rotation of element 75 in arcuate paths which are eccentric to the axis of element rotation to points at which each of their companion tracks originated. At these points, the machining of the surface 279, to provide tracks 280x and 280z, forms cogs 281x and 281z that are axially offset approximately 1 degree to the cogs 81x and 81z.

When the element 271 is rotated in one direction relative to the clutch element 75, the latch 272 will engage one of the cogs 281x and 281z to rotate the element 75. Rotation of the element 75 causes rotation of the shaft 64 and movement of the feed member frame 41, as heretofore described. However, rotation of the clutch element 271 in the opposite direction causes the latch 272 to disengage any previously engaged cog 281x or 281z and to move over the tracks 280x or 280z, skipping over the cogs, without engagement thereof.

Like the part 91 which rotates the part 61, part 291 is a gear in the form of a double rack. The rack 291 has two parallel bars 293a and 293b of teeth 294a and 294b. The bars 293a and 293b are connected at their ends 298a and 298b by spacers 295 and 296 bolted to the bars by suitable bolts. The spacer 296 at the end 298a of part 291 has bifurcations 298 meshing, clevis-wise as shown in FIG. 10 of the accompanying drawings, and with and by a pin 300 is pivotally connected to a lower end 299 of a second slide bar 301. The second slide bar 301 slidably engages guide bearing 302 on an end wall 304 of the housing 67 opposite to the end wall 104 on which guide bearing 102 supports the slide bar 101.

Like the slide bar 101, the slide bar 301 has teeth 310 which mesh with the counter pinion 117 on shaft 118 in the change gear train 109. Thus, the rotation of shaft 118 in response to the transmission through the gear train 109, already described, causes rotation of pinion 117 and movement of the slide bar 301 in the vertical path set for such movement by the guide bearings 302. Such vertical path is one in which rack end 298a connected by pin 300 to the lower end 299 of the slide bar 301 moves along a straight line indicated by the broken line 288 shown in FIG. 7 of the accompanying drawings.

As will be seen, the path 288 intersects the horizontal plane indicated by line 89 in FIG. 7 of the drawings and is spaced from and is on the opposite side of the vertical plane indicated by line 90 as that on which the path of end 98a, indicated by line 88, extends. Preferably, as the drawings indicate, paths 88 and 288 are parallel to each other and to the vertical plane of line 90. The path 288, also like path 88, extends from a point, namely the point 297 on the path line 288 well above the horizontal plane of line 89, to a point, namely the point 303 on line 288, well below said horizontal plane. Preferably, the paths 88 and 288 are of equal length and their segments on either side of the horizontal plane of line 89 are equal in length.

Just as the part 91 is supported by the stirrup block 105 in operative relation to part 61, so, also is part 291 supported by a similar stirrup block 305 in operative relation to part 261. The block 305 has inner guide slide bearing surfaces 306a and 306b for the bars 293a and 293b of the rack part 291. In addition, the block 305 has a web 307 that extends between the bars 293a and 293b and engages the hub 269 to thereby support the block 305 for pivotal movement relative to the part 261 and the rack bars so that their teeth mesh with the teeth of the part 261. Now, when the slide bar 301 reciprocates, the rack end 298a, by reason of its connection to the bar end 299, will move along the heretofore described path 288 and relative to the axis of rotation of the part 261.

This movement causes the rack part 291 to move endwise and tiltingly relative to said axis of rotation of the part 261. When the rack part 291 moves endwise, its sets of teeth 294a and 294b engage teeth 268a and 268b on the part 261 in the manner of gears causing the part 261 to rotate. When, however, the rack part 291 moves tiltingly, the rack teeth 294a and 294b tend to walk around the teeth 268a and 268b, instead of engaging such teeth in gear action. When the rack part 291 walks around the teeth of the part 261, the part 261 remains stationary notwithstanding the continued movement of the rack part 291 or movement of the plunger 22 which, through rack 130 and gear train 109, continues to move the rack part 291. The rotation and dwell of the part 261, through engagement of the clutch element 271 and 75, the shaft 64, crank 83 and link 84 causes movement and dwell of the frame member 41 of the transfer feed in a desired synchrony and cooperation with the movement and dwell induced upon the frame member 41 by the heretofore described operation of rack part 91 on the part 61.

Essentially, this synchrony and cooperation is accomplished by an arrangement whereby the dwell producing tilting movements of the rack parts 91 and 291 occur at the same time and the endwise movements of each of the two rack parts in directions that rotate their respectvie parts 61 and 261 to advance the clutch wheel element 75 occur in alternately successive periods. Thus, while rack part 91 is being moved endwise to rotate part 61 and its connected clutch element 71 in a direction such that latch 72 disengages the cogs 81x and 81z, the rack part 291 may be moved endwise to rotate part 261 and clutch element 271 in a direction so that latch 272 engages cogs 281x or 281z of the clutch element 75, rotating the element 75 and shaft 64 and through crank 83 and link 84 moving the feed frame member 41. When, on the other hand, the rack part 91 is moving endwise to rotate part 61 and clutch element 71 in a direction so that latch 72 engages cogs 81x or 81z to rotate shaft 64 and move the feed frame member 41, the rack part 291 is moving in a direction such that the rotation of part 261 induced thereby effects disengagement of latch 272 with cogs 281x and 281z.

As the rack end 298a moves along the path 288 from from point 297 toward the horizontal plane of line 89, the rack part 291 is caused to both tilt and move endwise. The tilting and endwise movements are in opposite directions to the directions in which the rack part 91 is caused to tilt and move endwise when its end 98a moves along its path line 88 from point 97 toward the horizontal plane of line 89. Like the relation between the tilting movement of the rack part 91 and the rotation of part 61 induced by such endwise movement of the rack part 91, the tilting movement of the rack part 291 is in the opposite direction to the rotation of the part 261 induced by the endwise movement of the rack part 291. The rotation of the part 261 thus induced is such as to rotate the clutch element 271 and equal angular distance to that in which the element 71 is rotated but in a clutch back-run direction wherein the latch 272 thereon does not engage the cogs 281x or 281z on the clutch element 77, while rack part 91 causes rotation of part 61 and clutch element 71 in a clutch drive direction.

When, the rack end 298a, in moving along its path line 288, reaches point m' in its path, the combined tilting and endwise movement of the rack part 291 becomes exclusively a tilting movement. Point m' on path line 288, like point m the path line 88, is spaced from the plane of line 89 a distance equal to the pitch radius of the teeth on part 261 and is on the same side of the horizontal plane of line 89 as the point m occurs. The exclusive tilting movement of the rack part 291 continues until the rack end 298a passes through the horizontal plane of line 89. During this phase of movement, rack part 291 walks around the part 261 allowing part 261 to dwell while rack part 91 walks around part 61.

As the rack end 298a continues to move along its path line 288 crossing the horizontal plane indicated by the line 89 to approach point 303, the rack part 291 moves in a combined tilting and endwise manner, but now in a direction to cause clutch drive between the latch 272 and one of the cogs 281x and 281z. At this same time, the rack end 98a of the rack part 91 will have also crossed the horizontal plane indicated by line 89 and be approaching point 103 in its path. However, the movement of the rack end 98a at this time will produce only such combined endwise and tilting movement of the rack part 91 as will cause rotation of the part 61 and clutch element 71 in a clutch back-run direction. It will thus be apparent that by using the parts 261 and 291 and element 271 in conjunction with parts 61 and 91 and element 71 that the drive and motion of the feed member frame 41 may be prolonged, taking place during a longer period in the movement of the plunger 22 and consequently being accomplished with less jerkiness or quick changes in direction of its movement. This, as was before noted, contributes to the safe and sure handling of blanks B and their being placed in registration at the die stations I to V, inclusive.

The clutch drive movement of the element 271 on the element 75 continues until the rack end 298a reaches point 303 in the path line 288 and the rack end 98a of rack part 91 reaches point 103 in its path line 88 and the plunger 22 reaches its lower most point of movement in its stroke shown on FIG. 14 of the accompanying drawings as occurring at one hundred and eighty degrees of crank shaft rotation. Now, both rack ends 298a and 98a begin their return movements. The return movement of rack end 298a causes the rack part 291 to move endwise and tilting and to produce rotation of the part 261 and element 271 in a clutch back-run direction and to continue so to do until the rack end 298a reaches the horizontal plane indicated by line 89. However, it will be recalled, that the rack part 91 in this phase is moving endwise and tilting to produce rotation of part 61 and element 71 in a clutch drive direction, wherefor the return movement of the feed frame member 41 initiated by the just described movement of the rack end 298a toward point 303 is continued by the now upward, as viewed in FIG. 7 of the accompanying drawings, movement of the rack end 98a.

Now both rack ends 298a and 98a pass across the horizontal plane indicated by the line 89 and approach their respective points m' and m. During this stage, both rack parts 291 and 91 move entirely tiltingly and walk about their respective parts 261 and 61, allowing the same and the feed frame member 41 to dwell, as shown diagrammatically in FIG. 14 of the accompanying drawing.

As the rack end 298a passes point m' in its path along line 288, the rack part 291 again begins to move both tiltingly and endwise producing rotation of the part 261 and the clutch element 271 in a clutch drive direction with respect to the clutch element 75. The rack part 91 in this phase is moving its part 61 and the clutch element 71 in a clutch back-run direction relative to the clutch element 75, wherefore the initial movement of the feed member frame 41 forward after its dwell in a retracted position is caused by the drive communicated through the rack part 291 to the part 261 and clutch elements 271 and 75. This continues until the rack ends 298a and 98a reach points 297 and 97 in their respective paths 288 and 88. At this time, the plunger 22 will have just completed its return stroke and be in preparation for a new stroke.

To assemble a structure like that shown in the accompanying drawings, the clutch element 75 is first keyed to the shaft 64 and the plunger 22 is positioned in its full open position. The clutch elements 71 and 271 are then positioned on the shaft 64 and rotated until each of both latches 72 and 272 thereof engage a cog 81x, 81z, 281x and 281z. The rack parts 91 and 291 are then placed in mesh with the respective parts 61 and 261 and blocks 105 and 305 engaging the parts are attached. The press plunger 22 is moved to mid downstroke position. After the plunger 22 is located in its mid downstroke position, the crank 83 is placed on the shaft 64 and keyed thereto so that it extends from said shaft in a position that is its full forward throw position, with respect to the feed frame member 41 that is reciprocated by the crank. By asembly in such order, a synchrony of operations between the press plunger 22 and feed member frame 41 diagrammatically shown in FIG. 14 of the drawings is assured.

The relation between the plunger 22 and the parts 61 and 261 in a structure embodying my invention is such that, as the plunger 22 moves through a complete reciprocation, the parts 61 and 261 are caused to rotate a number of degrees in a clutch drive direction which, in accumulation, totals something between three hundred and sixty and seven hundred and twenty degrees, both inclusive. In the particular structure shown in the accompanying drawings, this relation is such that a complete reciprocation of the plunger 22 causes the parts 61 and 261 to accumulatively rotate approximately four hundred and forty degrees in a clutch drive direction. Two quarters of this accumulative clutch drive rotation is produced by rotations of one of the parts, each quarter being accomplished at one of two different and successive times, and while the other part is rotating equal angular distances in a clutch back-run direction. The remaining two quarters of the accumulative clutch drive rotation is produced by the rotations of the other of the parts, each quarter being accomplished at one of two different and successive times that are in alternating relation to the times the first named part is rotating each of its quarters of the accumulative clutch drive rotation, and at the same time as the first named part is rotating equal angular distances in a clutch back-run direction. Hence, the function of clutch drive passes from part to part as in a relay in which each part runs its course passing the function at the end of its course to the other part until four courses have been run.

The mentioned series of such clutch drive rotations of the parts 61 and 261 is diagrammatically illustrated in FIG. 14 of the accompanying drawings. Starting at the left side of that figure, at the zero point on the scale 25, line 24 shows the plunger 22 in its full open position, preparatory to beginning a downstroke. Just below the scale are diagrammatic illustrations of the clutch elements 71 and 271 and 75 and the relative positions they take in the sequence as a consequence of the movement of the plunger 22 from full open to full closed (at one hundred and eighty degrees on scale 25) positions and again from full closed to ful open (at three hundred and sixty degrees on scale 25) positions. Thus, the vertical pair of diagrams vertically aligned substantially with and below the zero point on the scale 25 show the elements 71 and 271 with their latches 72 and 272 each in engagement with a cog on the element 75. The position of the crank 83 with respect to its axis of rotation at that moment is also diagrammatically shown.

Now, as the plunger 22 moves to mid downstroke (approximately ninety-seven degrees on scale 25 of FIG. 14) element 71 will rotate substantially one hundred and ten degrees in a clutch drive direction, indicated by the arrow cd, moving the element 75 and crank 83 in the same direction. At the same time this is taking place, element 271 rotates substantially one hundred and ten degrees in the opposite or a clutch back-run direction. The latch 272 on element 271 is now substantially two hundred twenty degrees in a clutch drive direction from the latch 72 and substantially forty degrees, also in a clutch drive direction, from the nearest cog 281z on the clutch element 75.

As the plunger 22 continues to move downwardly toward full closure, as shown diagrammatically in FIG. 14 of the accompanying drawings by the line 24 converging toward line 26 in the region between ninety-seven degrees and one hundred and eighty degrees on scale 25, the clutch element 271 moves in a clutch drive direction substantially one hundred and ten degrees, while clutch element 71 moves in a clutch back-run direction one hundred and ten degrees. The changed positions of the elements resulting from such movement is illustrated diagrammatically in FIG. 14 by the sets of diagrams of the clutch elements which appear substantially vertically aligned with and below the ninety-seven degree and one hundred an deighty degree points on scale 25. It will be apparent from these diagrams that the clutch element 271, in moving in a clutch drive direction, moves its latch 272 relative to the clutch element 75 through approximately forty degrees of clutch run and until the latch 272 engages the cog 281x. During this period of clutch run, the clutch element 75, the crank 83 and feed member frame 41 connected thereto all dwell, not only because of the mentioned clutch run of the latch 272 and clutch element 271 but also because the clutch element 71 is at the same time moving in a clutch back-run direction.

After having rotated through the clutch run phase, clutch element 271 continues to rotate in a clutch drive direction with its latch 272 in mesh engagement with cog 281x and thereby moving the clutch element 75 through approximately seventy degrees in the clutch drive direction indicated by the arrow cd in FIG. 14.

During the period of this dwell and motion, the clutch element 71 has been rotating in a clutch back-run direction to place its latch 72 into mesh with cog 81x on the clutch element 75 just as the element 271 and its latch 272 completes the clutch drive movement just described. It will be recalled that in describing the relative positions of cogs 81x and 81z to the cogs 281x and 281z, mention was made that the cogs 281x and 281z were approximately one degree in a counter clockwise direction from axial alignment with cogs 81x and 81z. The reason for such provision, namely: to assure intermesh of latch 72 with cogs 81x and 81z following clutch drive of clutch element 75 by the latch 272 of clutch element 271 at this point in the drive operation, should now be apparent to those skilled in the art.

The press plunger 22 having completed its closure begins to open and its return to the position from which it started the reciprocation being here described. As the plunger moves toward mid upstroke, latch 72, engaging cog 81z on the element 75, rotates said element in a clutch drive direction moving the crank 83 to a position that coresponds to its position when the feed member frame 41 has been fully retracted. This is again diagrammatically illustrated in FIG. 14 of the accompanying drawings, the movement and position of the press plunger 22 being shown by the line 24, diverging from the line 26 upwardly and crossing the point coresponding to approximately two hundred and sixty-three degrees on scale 25, and the change in positions of the clutch elements 71, 271 and 75 being shown in the diagrams of those elements appearing approximately vertically aligned with and below the one hundred and eighty degree and the two hundred and sixty-three points on the scale 25 of FIG. 14.

Again, it will be observed from these last mentioned diagrams, that, as the latch 72 on element 71 was moving the element 75 approximately one hundred and ten degrees in a clutch drive direction, the element 271 was moving its latch 272 approximately one hundred and ten degrees in a clutch back-run direction, placing the latch 272 approximately forty degrees in a clutch drive direction from engagement with the cog 281z on the element 75. Thus, as before described, the clutch element 75, the crank 83 and the feed member frame 41 will dwell as the plunger 22 continues its upward movement from mid upstroke toward its full open position at the point indicated three hundred and sixty degrees on scale 25. For it will be, during this period, that the clutch element 271 moves in a clutch drive direction approximately one hundred and ten degrees, of which substantially forty degrees will be under clutch run conditions, while the clutch element 71 moves also approximately one hundred and ten degrees in a clutch back-run direction. As a consequence of these rotations the elements take the positions illustrated diagrammatically in FIG. 14 in the diagrams vertically aligned with and below the right end of the scale 25. These positions are naturally the same as the positions shown at the left end of the scale 25 and contemplate the end and beginning of successive strokes of the plunger 22 and operations of the press 10.

The just described reciprocatory movement of the feed frame member 41 is diagrammatically indicated by the heretofore mentioned line 41a in FIG. 14 of the accompanying drawing. Just as the distance between the line of scale 25 and the line 26 in FIG. 14, is diagrammatic of the length of the stroke of the press plunger 22 so also it is diagrammatic of the length of stroke of the feed frame member 41. The line of the scale 25 diagrammatically coincides with the full retracted position of the member 41 and line 26 with its full advanced position. Thus, the line 41a indicates, by its descent from the line of the scale 25 toward line 26 at about the three hundred degree point on the scale 25 shown in FIG. 14, the beginning of the forward stroke of the feed frame member 41. This initial movement, from the previous description and an examination of the FIG. 14 diagrams, will be seen to be the consequence of a clutch drive by the clutch element 271 engaging cog 281z of clutch element 75 moving the crank 83 forwardly (rightwardly on the drawing) from the position shown in diagrams substantially vertically alligned with and below the two hundred and sixty-three degree point on scale 25.

The line 41a, diagrammatically indicating the movement the feed frame member 41, continues its downward extent until, reaching the three hundred and sixty degree point on the scale 25, it "humps" slightly. The "hump" in line 41a indicates the momentary pause in forward progress of the frame 41 that occasions the pass of the driving function from latch 272 of element 271 to latch 72 of element 71. This pass takes place and is shown in the diagrams of these elements that are below the three hundred and sixty degree point on scale 25.

The continued progress of the advancing feed member frame 41 is shown by the line 41a as it extends from the zero point on scale 25 at the left hand end of FIG. 14. This progress is characteristically toward the plane of line 26 and is indicative of making and finally completing the forward stroke of the frame 41 at a point about at the ninety degree point on the scale 25. The line 41a then extends parallel to and coincident with line 26 from the ninety degree point on scale 25 to about the one hundred and thirty-five degree point on scale 25. This diagrammatically indicates a dwell of the feed member frame 41 in its advance position. Such dwell is due, as has been previously explained, to the fact the rack parts 91 and 291 walk around their respective parts 61 and 261 and the latch 272 clutch runs toward engagement with the cog 281x of element 271.

At the end of the dwell, the line 41a extends away from the plane of the line 26, ascending in FIG. 14, to indicate diagrammatically the beginning of the return or retracting stroke of the feed member frame 41. This initial stage of the return stroke is caused by reason of the drive exerted by latch 272 on cog 281x which moves the crank 83 from a position shown in the diagrams below the one hundred and thirty degree point on scale 25 of FIG. 14 to the position shown in the diagrams below the one hundred and eighty degree point on said scale. The function of driving the element 75 and crank 83 now passes from latch 272 to latch 72 of element 71, accounting for the "hump" in line 41a at a point coinciding with about the one hundred and eighty degree point on the scale 25.

After the latch 72 takes over the driving function, the line 41a, indicating the steady movement of the feed member frame 41 toward its fully retracted position, converges toward the plane of scale 25 and becomes parallel to or coincident therewith at about the two hundred and fiifty-five degree point on the scale 25. The portion of the line 41a that is parallel or coincident with the plane of scale 25 extends to about the three hundred degree point on the scale, indicating diagrammatically the second dwell of the feed member frame 41 of that duration but this time while the frame is in its fully retracted position. This second dwell, like the first dwell, is due not only to the returning walk around of the rack parts 91 and 291 relative to their respectively engaged parts 61 and 261 but also is due to the clutch run of the latch 272 relative to the element 75 to engage cog 281z thereof. After the second dwell has terminated, the feed member frame 41 begins a fresh advancing stroke indicated by the line 41a diverging downward from the plane of scale 25 and thus to continue the movement as described.

Those skilled in the art will have observed that the accumulative rotation of the elements 71 and 271 in a clutch drive direction in each stroke of the press plunger 22 exceeds that rotation, namely, a rotation of one hundred and eighty degrees, necessary to produce a stroke of the feed member frame 41 through the swing of the crank 83 on the shaft 64. Those so skilled will also have observed that the duration of dwell of the clutch element 75, the crank 83 and frame 41, over and above the dwell resulting when the parts 91 and 291 walk around parts 61 and 261, is determined by the extent that the accumulative rotation of said elements 71 and 271, in a clutch drive direction, exceeds a one hundred and eighty degrees rotation necessary to produce a stroke of the feed member frame 41. In the particular arrangement, the extent to which such element rotation exceeds the rotation necessary to produce a stroke of the feed member frame is approximately forty degrees and is determined by the pitch diameter of the parts 61 and 261. As shown, the parts each have a diametral pitch of twelve and pitch diameters of one and one-half inches.

Variations in the duration of the dwell for different purposes or as desired may be accomplished, therefore, in structures embodying my invention by substituting corresponding parts of different pitch diameters for the parts 61 and 261, in accordance with the following Table of Dwell Variations, wherein diametral pitches of the substitute parts are presumed to be twelve and the pitch diameters "PD" is stated in inches and wherein the duration of each dwell resulting from use of parts of such stated pitch diameters is expressed in degrees of rotation of the part substituting for part 261, the longer dwell, both in terms of time or of inches traveled by the plunger 22 during such time, being a dwell of greater number of stated degrees of rotation.

TABLE OF DWELL VARIATIONS (Due to "Clutch Run")

| "PD": | Dwell (two per stroke), degrees |
|---|---|
| 1.75 | None |
| 1.667 | 10.5 |
| 1.583 | 25.2 |
| 1.5 | 41.3 |
| 1.416 | 60 |
| 1.333 | 80.4 |
| 1.25 | 104.5 |
| 1.08 | 161.4 |

From the above table it may be concluded that the dwell due to clutch run may be increased in a given structure by utilizing parts 61 and 261 with a lesser pitch diameter.

The movements of the plunger 22 and the feed member frame 41 are also related in timing to the operations of the feed fingers 47, as they advance to engage and withdraw to disengage the work blanks B. This advance and withdrawal of the fingers 47 is shown diagrammatically by the line 47a on FIG. 14 of the drawings. The means 170 by which such operation of the fingers 47 and the synchrony thereof with the plunger and feed frame member movements is obtained will now be described.

*The Finger Drive Means 170*

Fundamentally, the finger drive means 170 provides a positive driving connection between the shafts 49 (see FIGS. 2, 3 and 13) and the just described means 60 for driving the feed member frame 41.

In order that this may be accomplished, one end of each shaft 49 is keyed and suitably connected, as shown at 171 in FIG. 4 of the drawings, to a sleeve 172 mounted for rotation in a journal bearing 173 on a cross bar 174 extending between and connecting the side bars 42 of the feed member frame 41. Each sleeve 172 has axially extending internal splines 175 and is adapted to receive a splined shaft 176 in telescopic and meshing relation with said sleeve and the splines 175 therewithin. The shaft 176 has a roll neck 177 that is rotatably borne by a journal 178 on a suitable bracket 179 mounted on and fixed to the bed plate 44. Thus, when each of the shafts 176 is rotated, the sleeves 172 and shafts 49 connected thereto will also be rotated whether the feed member frame 41 be in its advanced position, as shown in FIG. 4, or its retracted position, as shown in FIG. 2.

In order to rotate the shafts 176, a bevel gear 180 is keyed to one end of each shaft 176 and is adapted to mesh with a mating bevel gear 181. Both gears 181 are keyed to a counter shaft 182 (see FIG. 5) which is mounted for rotation in a journal 183 formed on the bracket 179 and in a journal 184 formed on a second bracket 185 also suitably fixed to the bed plate 44. The disposition of the gears 181 on the counter shaft 182 in relation to the gears 180 on shafts 176 is such that when the counter shaft 182 is rotated in one direction, both shafts 176 and thereto connected sleeves 175 and shafts 49 will be rotated, each in opposite directions. Rotation of the shafts 49 will produce common rotation of the pinions 48 and common movement of the racks 46 and fingers 47 on opposite sides of the frame 41 towards and away from each other to seize and release work blanks B, as desired.

Rotation of the counter shaft 182, at proper times in the movement of the feed member frame 41 and in the direction desired to accomplish the end required, is effected by a pinion 186 suitably keyed to the counter shaft 182. The pinion 186 is caused to rotate by a rack 187 supported in mesh with the pinion 186 and for endwise reciprocatory movement by a guide bearing 188 mounted on bracket 179. One end of the rack 187 may be connected, as by suitable bolts 189, to a strap 190 of an eccentric 191 mounted on and keyed to a power shaft 192. The shaft 192 (see FIG. 5 of the drawings) is supported for rotation in journal brackets 193 mounted on housing 67. Rotation of the shaft 192 will cause reciprocation of the rack 187 and intermittent rotation of the counter shaft 182 in first one and then in the opposite direction.

The rotation of shaft 192, both in time and direction, is made to depend upon the movement of the press plunger 22. In other words, the shaft 192 is caused to rotate in a direction producing rotation of the shafts 49 to move the fingers 47 away from each other, after the feed frame member 41 has reached and is dwelling in its advanced stroke and as the plunger 22 is passing from mid downstroke to full closure. The synchrony of these movements is diagrammatically indicated on FIG. 14, where the line 47a steps downward from a plane more proximate the line 26.

The fingers 47 remain withdrawn until just after the feed frame member 41 reaches its retracted position and has begun to dwell there and the plunger 22 is passing from mid upstroke toward its full open position. The fingers 47 are then actuated to approach each other to close on the work blanks B in contemplation of a new forward movement of the feed member frame 41. This, too, is diagrammatically illustrated in FIG. 14 by the stepping up of the line 47a, away from the plane of line 26 toward the plane of scale 25. The remainder of the fingers 47 in their work engaging positions is indicated by the extension of line 47a in a parallel and more proximate relation to the plane of the scale 25.

In order that the shaft 192 may be rotated by the movement of the plunger 22 and in time and direction with such movement, shaft 192 is operatively connected to the extension 119 of shaft 118 of the change gear train 109. The extension 119 of shaft 118 extends (see FIG. 6 of the accompanying drawings) beyond the gear 124 and has one of its ends supported in a journal 121 in wall 123 of the gear case 122. A bushing sleeve 193 mounted on the shaft extension 119 on the outer side of gear 124 serves to space said gear from a wiper unit 194, the details of which are better shown in FIG. 12 of the drawings. The wiper unit 194 is mounted on and keyed to the shaft extension 119 and includes a drum head cam part 195 integral with and axially parallel to a radially extending crank part 196. The crank part 196 is designed to cooperate gear-wise with a Geneva gear 197 mounted on and keyed to an end of the shaft 192 in plane with the drum head cam part 195.

The Geneva gear 197, as more clearly appears in FIG. 12 of the accompanying drawing, is disposed in an approximate tangential and co-planar relation with the cam part 195 of the wiper unit and has a radially extending, open ended slot 198. When, in the rotation of the shaft 118 and extension 119 the crank part 196 is caused to sweep over and past the Geneva gear 197, the slot 198 in the Geneva gear is adapted to receive a wrist pin roller 199 mounted on the free end of the crank part 196 of the wiper unit. The wrist pin roller 199, acting against the edges of the slot 198, when, for example, the crank part 196 is being moved counter-clockwise, as viewed in FIG. 12 of the drawings, from its full line position shown therein to a position indicated by the broken line marked 196a in that drawing figure, causes the Geneva gear 197 to rotate clockwise. This produces rotation of the shaft 192 and movement of the eccentric 191 and its strap 190, from the full line position shown in FIG. 12 to the broken line position there indicated. The movement of the eccentric strap 190 causes the rack 187 to make a stroke, rotating the pinion 186 in mesh with said rack and the shaft 182 keyed to said pinion 186. Through meshing bevel gears 180 and 181, rotation of the shafts 49 takes place in directions moving the fingers 47 away from each other. This finger movement releases whatever work blanks B the fingers 47 may have then been engaging.

So also, when the shaft 118 and its extension 119 rotates in the opposite direction, the crank part 196 will swing upwardly, as viewed in FIG. 12 of the drawings, causing its pin 199 to again engage the edges of the slot 198 and to rock the Geneva gear 197 in a counter-clockwise direction. Corresponding rotation of shaft 192 produces reverse movement of the eccentric strap 190 and stroke of the rack 187 to cause reverse rotation of the shaft 182, gears 180 and 181 and the shafts 49. In response to such rotation of the shafts 49, the fingers 47 now move toward each other to engage work blanks B in preparation for the forward movement of the feed frame member 41.

Rotation of the shaft extension 119 as a consequence of rotation of pinion 117 through degrees beyond that required to actuate the Geneva gear 197 is expended in a swing of the crank part 196 to positions beyond those in which the pin 199 engages the slot 198 such as to positions indicated by the broken line showings marked 196b and 196c in FIG. 12 of the accompanying drawings. In order to "lock" the fingers 47 in a position, particularly in their extended work blank engaging position, while the pin 199 on the crank part 196 is disengaged from the slot 198 and is being moved to and from their positions 196b and 196c, the Geneva gear 197 and the drum part 195 of the wiper unit 194 engage to resist movement of the Geneva gear 197. To this end the Geneva gear has a pair of involute arcuate edge surfaces 200 and 201 which originate on opposite sides of the open end of the slot 198 and extend in a direction which is generally chordal to the axis of rotation of the Geneva gear 197. The arcs through which the edge surfaces 200 and 201 extend are each an arc having the radius of the same length as the radius of the drum part 195 of the wiper unit 194. Thus, the edge surfaces 200 and 201 will mate and fit with a circumferential edge surface 203 of the drum part 195.

It will be seen, as in FIG. 12 of the drawings is shown, that when one of the arcuate edge surfaces 200 and 201 of the Geneva gear is in mating relation with the circumferential edge surface 203 of the drum part, rotation of the Geneva gear 197 will be resisted. Thus, the shaft 192 will be locked against rotation, except when driven to rotate by cooperation of the crank supported pin 199 and the edges of the slot 198.

In order, in the structure shown in the drawings, that the slot 198 shall have its open end in a position to be in the path of the pin 199 in the sweep of the crank part 197, the Geneva gear 197 has opposite spaced and radially extending beaks 204. One side of each beak 204 is shown formed by one of the just mentioned arcuate side edges 200 and 201 and the other side of each beak is shown formed by one edge of the slot 198 with the open end of the slot between the beaks 204.

In order, in the rotation on the wiper unit 194, to avoid jamming between the drum part 195 and such beaks 204, the drum part may have bay 205 extending inwardly from its circumferential edge surface 203. The bay 205 is of sufficient radial depth to allow the beaks 204 to protrude therein without contact with the drum part 195, even when, in the course of relative movement of the crank part 196 and Geneva gear 197, the crank part 196 and slot 198 extend in a common line intersecting axes of the gear and crank. Thus, the rotation of the wiper unit 194 effects movement of the Geneva gear 197 only as the engagement of crank supported pin 199 with edges of the slot 198 dictate.

*Operation*

In the foregoing description of the structure constituting an embodiment of my invention, the functions and manner in which many of the structures perform has been already described. The sequence of such operation is diagrammatically shown in FIG. 14 of the drawings and the positions that various structures take in such sequence is shown in the other drawing figures.

For example, in FIG. 1 the press 10 is shown with its plunger 22 moving through its mid downstroke position, the feed frame member 41 having moved from the position shown in FIG. 2 of the drawings to its advanced position at which the fingers 47 gripping the work, as when in the FIG. 2 position, shortly will disengage to deliver the work blanks B to new die positions and the finished pan P for conveyance outwardly to the chute 30. As the advance of the feed frame member 41 occurs, the feed rollers 28 of the roll feed 29 actuate to advance the stock S, the lead portion of which has been notched at the first die station I, to a position where the lead portion of the stock is in registration with the second die station II.

At about this time wiper unit 194, shown in FIG. 12, is actuated in consequence of the descending plunger 22 and through the new extended spline sleeve and shaft 175 and 176, shown in FIG. 4, and the racks and pinions, shown in FIGS. 3 and 13, causes the fingers 47 to disengage the work blanks B. As the press plunger 22 completes its stroke to effect the various die operations at the several die stations I to V, inclusive, the feed frame member 41 and feed fingers 47 thereon have begun to move toward the position shown in FIG. 2 of the drawings in preparation for engagement of the fingers 47 with new work blanks B. The movement of the feed member frame 41 through the medium of the plunger actuated rack and pinion mechanism shown in FIGS. 6, 7, 8, 9, 10 and 11 has all been adequately described. Its synchrony in relation to the other operations is shown by the diagrams of FIG. 14.

Thus, it will be seen that the invention provides means whereby the motion and force exerted by a movable component, in this case, the plunger 22, of the relatively movable operation preforming components of a machine, like the instant press 10, for operating on materials are utilized to drive a means for feeding the work to the machine with a positive motion and periodic dwells in a proper and desirable synchrony, the arrangement being compact, simple and of low installation and maintenance cost and having a ready adaptability to a variety of types and sizes of machines.

I claim:

1. A work feeding means adapted for use with a sheet metal press having a frame and a pair of sheet metal forming components supported on the frame for relative movement towards each other to form sheet metal between the components and for relative movement away from each other to permit sheet metal formed or to be formed to be withdrawn, shifted or fed between the components, said work feeding means comprising a housing, a sheet metal feed member in movable engagement with the housing and supported for movement to and from a position between the components, a plurality of sheet metal engaging devices on the member, a first movable part, the part having a plurality of teeth in curvilineal succession on the part, means in engagement with and operatively connecting the part and member together whereby movement of the part causes movement of the member, a second movable part having a teeth bearing portion, means in movable engagement with the housing and the second part adapted for engagement by and operative connection with a movable of the relatively movable components whereby movement of that component causes second part movement, means in movable engagement with the parts for supporting them with teeth of the second part teeth bearing portion in mesh with the first part teeth and for guiding the second part in its movement relative to the first part and responsive to component movement into movements in one of which the second part teeth bearing portion moves parallel to lines intersecting the axis of curvilineal succession of the first part teeth and against the faces of successive of the first part teeth to move the first part relative to the second part and in another of which movements the second part pivots about a point at which its teeth bearing portion then meshes with the first part teeth and moves in an orbit extending about the mentioned axis of curvilineal succession of first part teeth to cause successive teeth of the second part teeth bearing portion to enter the spaces between successive teeth of the first part without displacement thereof and to track over the first part teeth thus allowing the first part to dwell notwithstanding the continued movement of the second part, and bearing means in engagement with the last mentioned means and the housing for supporting the parts and last mentioned means at a point on the housing at which with reference to the entire movement of the second part in response to a complete relative movement of the components towards and away from each other the second part moves to move its teeth bearing portion parallel to lines intersecting the axis of curvilineal succession of first part teeth and thus to move the first part and the member in that stage of component relative movement in which the components are spaced apart and at which in a subsequent stage of component relative movement in which the components are closer together than during the previously mentioned stage the second part moves to move its teeth bearing portion to track over the first part teeth to allow the first part and the member to dwell whereby sheet metal to be formed is fed, shifted or withdrawn by the member to, relative or from between the components in consequence of the movement of the components and in a precise synchrony therewith.

2. A work feeding means adapted for use with a sheet metal press having a frame and a pair of sheet metal forming components supported on the frame for relative movement towards each other to form sheet metal between the components and for movement away from each other to permit sheet metal to be formed to be withdrawn, shifted or fed between the components, said work feeding means comprising a housing, a movable sheet metal feed member in movable engagement with the housing, a plurality of sheet metal engaging devices on the member, a teeth bearing wheel, crank and linkage means in engagement with and operatively connecting the wheel and the member together whereby rotation of the wheel causes movement of the member, a rack, transmission means including a bar slidably engaging the housing and in pivotal engagement with one end of the rack and operatively connected to a movable of the relatively movable components whereby movement of that component causes bar and rack movement, means including a bearing in movable engagement with the wheel and the rack for supporting the same with their teeth in mesh and for movement while in mesh relative to each other, the wheel for rotation and the rack for endwise movement parallel to lines intersecting the wheel axis of rotation to thereby rotate the wheel and for tilting and orbital movement about the teeth of the wheel to thereby track about the wheel without moving the same, and means for supporting the wheel and bearing and the rack engaged thereby including a shaft in movable engagement with the wheel and with the housing at a point on the housing at which in the total movement of the rack in response to a complete movement of the relatively movable components to and from each other the rack moves endwise to thus move the wheel and member at those stages in the component relative movement in which the components are spaced apart and moves tiltingly and orbitally to track over the wheel allowing the wheel and member to dwell during stages in the components relative movement in which components are closer together than during the stages previously mentioned whereby the member is moved to feed, shift or withdraw sheet metal to be formed to, relative, or from between the components is in consequence of the component movements and in a precise synchrony therewith.

3. In a material forming machine including a frame having a material forming position thereon, a material forming component supported on the frame for movement relative thereto and toward the material forming position to form material and from the material forming position to allow material to be placed for forming in the material forming position, means on the frame in engagement with the component for moving the same to and from the material forming position, a member supported on the frame for movement substantially to and from the material forming position, and means on the member for engaging material to be formed; the combination therewith of a means for moving the member substatially to and from the material forming position including an element, means on the frame in movable engagement with the element and adapted to support the same for movement along a prescribed path, means in engagement with the component and element adapted to operatively connect the same whereby component movement produces element movement, a pair of movable parts, means in engagement with the element and with one of the parts providing an operative connection between the part and the element whereby element movement produces part movement, means in movable engagement with the other of the parts and the first mentioned part at points thereon spaced from the point at which the last mentioned means engages the first mentioned part and providing a support for mounting the other part for rotation relative to the first mentioned part and in surface contact with a surface thereof and for supporting the first mentioned part for movements that are lineally translatory, rotatory and orbitally translatory, the lineally translatory movement being along lines paralleling lines intersecting the axis of rotation of the other part and during such movement transmitting movement to the other part, the rotatory movement being about points at which the parts contact the surfaces of each other and during such movement transmitting no movement to the other part, the orbital and translatory movement being through an orbit extending about the other part and during such movement transmitting less movement to the other part than that transmitted when first mentioned parts move lineally and translatory, and means in engagement with the last mentioned means and the frame adapted to support the mentioned other part for rotation relative to the frame about an axis spaced from the mentioned path of element movement a distance less than the greatest dimension of the first mentioned part and so that when the material forming component moves toward and away from the material forming position the movement thereof transmitted to the element causes the first mentioned part to move lineally and translatory, rotatory and orbitally and translatory and thus to transmit movement to the other part and the member to a degree and in a sequence that produces member dwell and movement relative to the material forming position of a desired synchrony with the movement of the material forming component relative to the material forming position.

4. The combination described in claim 3 in which the first named part of the pair of movable parts is a rack, the other of the pair of parts is a pinion, the prescribed path of element movement is a straight one, and the other part is supported for rotation at a point on the frame such that the first named part in mesh therewith extends from its connection with the element at an angle less than a straight angle to the path of movement of the element.

5. The combination described in claim 4 in which the element comprises a slide bar and the means in engagement with the element and one of the parts comprises a pin on the bar in pivotal engagement with one end of the rack and the means in movable engagement with the element comprises a slide bearing in a position on the frame to support the slide bar for movement of its pivotal connection with the rack part along a straight line extending parallel to and spaced a distance less than the length of the rack part from a plane intersecting the axis of rotation of the pinion.

6. The combination described in claim 5 in which the therein mentioned slide bearing in slidable engagement with the slide bar is of a length and in a position on the frame to support the slide bar for movement of its pivotal connection with the rack along a straight line extending parallel to and spaced a distance less than the length of the rack from a plane intersecting the axis of rotation of the pinion and for movement from a point on said line on one side of a second plane intersecting the axis of rotation of the pinion at a right angle to the first mentioned plane to a point on said line on the other side of the second plane.

7. The combination described in claim 6 having in addition thereto a pair of clutch elements, one of the clutch elements being in engagement and rotatable with the pinion and the other clutch element being supported for rotation on the frame and operatively connected to the member whereby rotation of the other clutch element causes movement of the member relative to a position between the material forming components, said clutch elements having parts adapted to interengage only when the clutch element rotatable with the pinion rotates in one direction wherefor the mentioned other clutch element is likewise rotated.

8. A material feeding means adapted for use with a material forming machine which has a frame, a material forming station on the frame, a material forming component movably supported on the frame for reciprocation to and from the material forming station, a member movably supported on the frame for movement to and from the material forming station, and a plurality of material engaging devices on the member the combination therewith of a means for moving the member to and from the mentioned station comprising a housing, a first movable part having a plurality of teeth in curvilinear succession on the part, means in engagement with and operatively connecting the part and the member whereby movement of the part causes movement of the member, a second movable part having a teeth bearing portion, means in engagement with the housing and the second part adapted for engagement by and operative connection with the material forming component of the machine whereby component movement relative to the material forming station causes movement of the second part relative to the housing, means in movable engagement with and supporting the first and second named parts so that teeth of the second part teeth bearing portion mesh with the first part teeth and for guiding the second part in its movement responsive to component movement into movements in one of which the teeth bearing portion thereof moves parallel to lines intersecting the axis of curvilineal succession of first part teeth and against the faces of successive first part teeth to move the first part and in another of which the second part pivots about the point a which its tooth bearing portion then meshes with the first part teeth and moves in an orbit about the axis of curvilineal succession of first part teeth to cause successive teeth of the second part teeth bearing portion to successively enter the spaces between successive teeth on the first part without displacement thereof and to track over the first part teeth thus allowing the first part of dwell notwithstanding the continued movement of the second part, and means in engagement with the last mentioned means and with the housing adapted to support the parts for movement relative to the housing at a point with reference to the entire movement of the second part in response to a full reciprocation of the machine forming component operatively connected thereto at which the second part moves to move its teeth bearing portion against the first part teeth faces thus moving the first part and the member relative to the material forming station in that stage of the component reciprocation in which the component is spaced from the material forming station and at which in a subsequent stage of the component reciprocation in which the component is more proximate the material forming station than it is during the previously mentioned stage the second part moves to move its teeth bearing portion to track over the first part teeth allowing the first part and the member to dwell relative to the material forming station whereby the material to be formed may be fed and moved relative to the material forming station by the member in consequence of the reciprocation of the material forming component and in exact synchrony therewith.

9. In a material moving means adapted for use on a material forming machine having a material forming position thereon, said means including a frame, a member movably supported on the frame for movement substantially to and from the material forming position, and means on the member for engaging material to be formed; the combination therewith of a means for moving the member substantially to and from the material forming position including an element, means on the frame in movable engagement with the element and adapted to support the same for movement along a prescribed straight line path, a source of power mounted on the frame, means in operative engagement with the source of power and element for transmitting power to the element to move the same along the mentioned path, a pair of movable parts, each part having a plurality of teeth in successive continuity to each other on the part, the teeth on at least one of the parts in the continuity thereof describing an arc, means in engagement with one of the parts and the element whereby element movement produces part movement, means in movable engagement with the mentioned other part and with the element engaged part and providing a support for mounting the other part for rotation relative to the element engaged part about an axis coincident with that of the mentioned arcuate continuity of teeth and in teeth meshing relation with the element engaged part and for supporting the first mentioned part for movements that are rotatory about points at which the teeth mesh and that are orbitally translatory through an orbit extending about the other par, the element engaged part transmitting movement to the other part only when the element engaged part moves in an orbit, and means in engagement with the last mentioned means and the frame adapted to support the mentioned other part for rotation relative to the frame about an axis spaced from the mentioned path of element movement a distance less than the length of the path and so that when the element moves along the path the element engaged part is caused to move rotatory and orbitally translatory and thus to transmit movement to the other part and the member to produce alternate periods of member dwell and movement relative to a material forming position.

10. In a material forming machine having a frame, a pair of material forming components supported on the frame for relative movement towards each other to form material between the components and for movement away from each other to permit unformed material to be placed between the components, means on the frame in engagement with the movable of the components for moving the same, a member supported on the frame for movement to and from a position between the components, and means on the member for engaging material to be formed; the combination therewith of a means for moving the member including a pair of movable parts, each part having a plurality of teeth in lineal continuity to each other on the part, means in engagement with one of the parts and the member adapted to operatively connect the part and member whereby part movements causes member movement, means in engagement with the just mentioned part and the frame adapted to support the part for rotation relative to and about an axis on the frame, means in engagement with the frame and the other of the parts adapted to support the other part with its teeth in mesh with the teeth of the first mentioned part and for movements relative thereto in certain of which movements the other part teeth merely mesh with the teeth of the first menioned part and in the remainder of which movements the other part teeth both mesh and press against the teeth of the first mentioned part whereby the first mentioned part dwells during the mentioned certain movements of the other part and is moved during the mentioned remaining movements of the other part, and means in engagement with a movable of the relatively movable material forming components and with the mentioned other part and adapted to operatively inter-connect the other part and component whereby component movement produces movements of the other part alternately in movement in which the teeth of the other part mesh and press against the teeth of the first mentioned part and then in movement in which the teeth of the other part merely mesh with the teeth of the first mentioned part to produce alternate periods of movement and dwell of the member.

11. In a material moving means adapted for use on a material forming machine having a material forming position thereon, said means including a frame, a member movably supported on the frame for movement substantially to and from the material forming position, and means on the member for engaging material to be formed; the combination therewith of a means for moving the member substantially to and from the material forming position including an element, means on the frame in movable engagement with the element and adapted to support the element for movement along a path, a source of power mounted on the frame, means in engagement with the element and the source of power for transmitting power to the element to move the same along the mentioned path; a part having a plurality of gear teeth in successive continuity with each other; means in engagement with the part and the element whereby element movement produces part movement, a second part having a plurality of gear teeth in successive arcuate continuity with each other, bearing means in movable engagement with both parts and providing a support for mounting the second part for rotation relative to the first part about the axis of arcuate continuity of the gear teeth on the second part and in teeth meshing relation with the first part and for supporting the first part for movements that are pivotal about points at which gear teeth of the parts mesh and that are orbitally translatory in an orbit extending about the mentioned axis of the second part continuity of gear teeth, the first part transmitting movement to the second part only when the first part moves in the mentioned orbit, a second element rotatably supported on the frame in operative engagement with the member to move the same when and to the extent the second element rotates, the second element having two cogs thereon spaced from the axis of rotation of the second element and from each other and being each on one of two lines extending radially from the second element axis of rotation at an angle equal to the angle the second element is required to rotate to move the member to or from the material feeding station, a latch on the second part adapted to engage a cog of the mentioned cogs only when the second part rotates in one direction, and means in engagement with the bearing means and with the frame adapted to support the second part for rotation relative to the frame about an axis spaced from the mentioned path of movement of the first named element a distance less than the length of the path and at a point on a line that drawn toward the path intersects the path at right angles thereto and between the opposite ends thereof and so that, when the first named element moves along the path from one end thereof the first named part is caused to move at first orbitally translatory thus to transmit movement to the second part in a direction toward latch and cog engagement causing rotation of the second element and movement of the member relative to the material feeding station and thereafter the first named part is moved pivotally allowing the second part and member to dwell and then moved again orbitally translatory moving the second part in tthe opposite direction from latch and cog engagement allowing the second element and member to continue to dwell wherefore the dwell initiated by the pivotation of the first part as aforesaid is extended.

12. In a material moving means adapted for use on a material forming machine having a material forming position thereon, said means including a frame, a member movably supported on the frame for movement substantially to and from the material forming position, and means on the member for engaging material to be formed; the combination therewith of a means for moving the member substantially to and from the material forming position including a driving element, means on the frame in movable engagement with the driving element and adapted to support the same for movement along a path, a rack part, means in engagement with the rack part and the driving element whereby element movement produces rack part movement, a pinion part, means in engagement with the pinion part and member whereby movement of the pinion part produces member movement, means in movable engagement with the pinion part and the rack part and providing a support for mounting the pinion part for rotation relative to the rack part about the pinion part axis and in teeth meshing relation with the rack part and for supporting the rack part for movements that are rotatory about points at which the rack and pinion part teeth mesh and that are orbitally translatory through an orbit extending about the pinion part, the rack part transmitting movement to the pinion part only when the rack part moves in the mentioned orbit, and means in engagement with the last mentioned means and the frame adapted to support the pinion part for rotation relative to the frame about an axis spaced from the mentioned path of the driving element movement a distance less than the length of the path and so that when the driving element moves along the path the rack part is caused to move orbitally translatory and rotatory thus to transmit movement to the pinion part and the member to produce during part of the time the driving element moves along its path a period of member movement relative to the material forming position and, during the remainder of the time the driving element moves along its path, a period of member dwell.

13. A material feeding means having a frame, a feed member movably supported on the frame, means on the member for engaging material, and means for moving the member to and from a material feeding station and comprising a gear part supported on the frame for rotation, an element rotatably supported on the frame in operative engagement with the member to move the same when and to the extent the element rotates, the element having two cogs thereon spaced from the axis of rotation of the element and from each other and being each on one of two lines extending radially from the element axis of rotation at an angle equal to the angle the element is required to rotate to move the member to or from the material feeding station, a latch on the gear part adapted to engage a cog of the mentioned cogs only when the gear part rotates in one direction, a source of power, and a rack part operatively in engagement with the gear part and with the source of power for rotating the gear part alternately first in one direction and then in the other direction through an angular distance greater than the angular distance the element is required to rotate to move the member to or from the material feeding station so that alternately in the rotations of the gear part and while rotating in one direction the gear part rotates the element to move the member and, in the subsequent rotation of the gear part in a reverse direction, the element and member dwell.

14. In a sheet metal press having a frame, a movable plunger, and a movable work feeding member; the combination therewith of a means for moving the member to locate work for engagement by the plunger including a wheel having a plurality of teeth, means in engagement with the wheel and the frame supporting the wheel for rotation, means in engagement with and operatively connecting the wheel and member whereby rotation of the wheel causes member movement, an elongated part having a plurality of teeth, bearing means on the frame in engagement with and supporting the part for tilting and endwise movements and in mesh with the wheel at a point on one side of a horizontal plane extending normal and diametrically to the wheel and so that tilting movement of the part causes it to walk about the wheel allowing the wheel to dwell and so that endwise movement of the part causes gear action between it and the wheel to rotate the wheel, means on the frame in engagement with the part adapted to limit the movement of an end of the part to a path that intersects the mentioned plane and is on one side of and spaced a distance less than the length of the part from a second plane normal to the first mentioned plane and normal and diametric to the wheel whereby movement of the part end along a segment of said path between the first mentioned plane and a point on the path on the side of the first mentioned plane on which the wheel and part mesh and spaced from the first mentioned plane a distance equal to the wheel radius causes the part to tilt about the wheel and movement of the part end along the remainder of the path causes endwise movement of the part, and means in engagement with the part and plunger and operatively connecting the same whereby movement of the plunger causes sequential tilting and endwise movements of the part and consequent movement and dwell of the wheel and member in synchrony with the movement of the plunger.

15. A sheet metal press having a means for moving a work feeding means member described in claim 14 in which the means operatively connecting the wheel and member includes a pair of rotatable clutch elements; one of said clutch elements being operatively connected to said member and the other of said clutch elements being in engagement with the wheel and movable therewith, means on each clutch element adapted to interengage when the clutch elements are rotated in one direction relative to each other and to disengage when the clutch elements are rotated in the opposite direction whereby rotation of the wheel in one direction causes interengagement of the clutch elements and movement of the member and rotation of the wheel in the other direction causes disengagement of the clutch elements allowing the member to dwell; said clutch elements being so related to each other and to the rotation of said wheel that when the end of the bar part moves in its path toward the mentioned segment thereof and from either side thereof the rotation of said wheel about its axis as a consequence of the endwise movement of said bar part is in a direction causing interengagement of the clutch elements and, when said end of the bar part moves away from the path segment, on either side thereof, the rotation of said wheel about its axis as a consequence of the endwise movement of said bar part is in a direction causing disengagement of said clutch elements whereby the movement of the bar part end along its path away from said path segment extends the dwell of the member initiated when the bar part end moved through said path segment.

16. A material feeding means having a frame, a feed member movably supported on the frame, means on the member for engaging material, and means for moving the member to and from a material feeding station and comprising a pair of parts supported on the frame for pivotal movement back and forth over paths that overlap each other only at one of the ends thereof, an element rotatably supported on the frame in operative engagement with the member to move the same when and to the extent the element rotates, the element having two cogs thereon spaced from the axis of rotation of the element and from each other and being each on one of two lines extending radially from the element axis of rotation at an angle equal to the angle the element is required to rotate to move the member to or from the material feeding station, a latch on each part adapted to engage one of the cogs only and only when the parts rotate in one direction, a source of power, and means individual to each part operatively in engagement therewith and with the source of power for rotating the parts coincidentally first away from and then toward each other through an angular distance greater than half and less than all the angular distance the element is required to rotate to move the member to or from the material feeding station and so that when the parts rotate away from each other the latch on one part engages an element cog to rotate the element and thereby positions the other element cog and the latch on the other part in an arcuately spaced relation and at points on lines radial to the element axis of rotation that extend at an angle to each other substantially equal to twice the angle a part rotates less the mentioned angle of the lines on which the cogs are located and when the parts next rotate toward each other the element and member dwell while the mentioned other part rotates to move the other part latch across the space of the mentioned arcuately spaced relation.

17. A material feeding means having a frame, a feed member movably supported on the frame, means on the member for engaging material, and means for moving the member to and from a material feeding station and comprising a pair of parts supported on the frame for individual pivotal movement, an element rotatably supported on the frame in operative engagement with the member to move the same when and to the extent the element rotates, the element having two cogs thereon spaced from the axis of rotation of the element and from each other and being each on one of two lines extending radially from the element axis of rotation at an angle equal to the angle the element is required to rotate to move the member to or from the material feeding station, a latch on each part adapted to engage one of the cogs only and only when the parts rotate in one direction, a source of power, and means individual to each part operatively in engagement therewith and with the source of power for rotating the parts coincidentally in opposite directions to each other and each alternately first in one direction and then in the other direction through an angular distance greater than half and less than all the angular distance the element is required to rotate to move the member to or from the material feeding station so that alternately in the rotation of the parts and while rotating in certain directions one part rotates the element and the other part moves the latch supported thereby to locate the last mentioned latch and the element cog adapted to be engaged thereby in an arcuately spaced relation and at points on lines radial to the element axis of rotation that extend at an angle to each other substantially equal to twice the angle a part rotates in either direction less the mentioned angle of the lines on which the cogs are located whereby, in the subsequent rotation of the parts in directions reverse to the mentioned certain directions, the element and member dwell while the mentioned other part rotates to move the latch supported thereby across the space of the mentioned arcuate spaced relation to engage the mentioned element cog.

18. A material feeding means having a frame, a feed member movably supported on the frame, means on the member for engaging material, and means for moving the member to and from a material feeding station and comprising a pair of parts supported on the frame for pivotal movement back and forth over paths that overlap each other only at one of the ends thereof, an element rotatably supported on the frame in operative engagement with the member to move the same when and to the extent the element rotates, the element having two pairs of cogs, each cog of each pair being spaced from the axis of rotation of the element and from the other cog of the pair and being each on one of two lines radially from the element axis of rotation at an angle equal to the angle the element is required to rotate to move the member to or from the material feeding station, a latch on each part adapted to engage the cogs of one pair only and only one cog at a time when the parts rotate in one direction, a source of power, and means individual to each part operatively in engagement therewith and with the source of power for rotating the parts coincidentally first away from and then toward each other through an angular distance greater than half and less than all the angular distance the element is required to rotate to move the member to or from the material feeding station so that, when the parts rotate away from each other, the latch on one part engages a cog of one pair of cogs to rotate the element and position a cog of the other pair of cogs and the latch on the other part in an arcuately spaced relation and at points on lines radial to the element axis of rotation that extend at an angle to each other substantially equal to the angle the parts rotate away from each other less the mentioned angle of the lines on which the mentioned other pair of cogs are located and, when the parts next rotate toward each other, the element dwells while the mentioned other part rotates to locate the latch supported thereby in engagement with the mentioned cog of the other pair.

19. A material feeding means having a frame, a feed member movably supported on the frame, means on the member for engaging material, and means for moving the member between spaced material receiving and feeding stations comprising a pair of parts supported on the frame for rotation in paths that overlap each other only at one of the ends thereof, an element rotatably supported on the frame in operative engagement with the member to move the same when and to the extent the element rotates, the element having two pairs of cogs, each cog of each pair being spaced from the other cog of the pair and from the axis of rotation of the element and being each on one of two lines extending radially from the element axis of rotation at an angle equal to that the element is required to rotate to move the member between spaced material receiving and feeding stations, a latch on each part adapted to engage at one time one cog of the cogs of one pair only and only when the parts rotate in one direction, a source of power, and means individual to each part operatively in engagement therewith and with the source of power for rotating the parts coincidentally first away from and subsequently toward each other through an angle greater than half and less than all the angle the element is required to rotate to move the member between the material receiving and feeding stations and so that the parts, in rotating away from each other, move the latch of one part to engage a cog of one pair of cogs to rotate the element and move the member to the material feeding station and a cog of the other pair of cogs and the latch of the other part to a spaced relation to each other in which the last named cog and latch are each on one of two lines radial to the element axis of rotation that extend angularly to each other at an angle that is substantially equal to the angle the parts rotated away from each other less the angle between lines radial to the element axis of rotation on which the last mentioned cog and the first mentioned cog of the other pair of cogs are then located and, in the parts subsequently rotating toward each other, move the mentioned other part and the latch supported thereby toward the mentioned cog of the other pair of cogs during which the element first dwells and then moves to move the member from the material feeding station toward the material receiving station.

20. A material feeding means as described in claim 19 in which the therein mentioned parts are supported on the frame for pivotal rocking movements about a common axis and have pinion gear portions and the therein mentioned individual means for moving each part includes a rack having one end free and other end limited to lineal movement along a path extending parallel to a line intersecting the mentioned common axis from a point on one side to a point on the other side of a plane at right angles to and intersecting the mentioned path and axis, each rack being in poise on and in mesh with one of the gear portions so that when the rack ends are at one of the mentioned path terminal points the parts are at the overlapping ends of their respective paths of rocking movement and whereby movement of the rack ends from one to other of the mentioned path terminal points causes two periodically spaced endwise movements of the racks alternately in opposite directions to first move the parts away from each other and then toward each other and a thereto intermediate rack tilting movement in the interval between the mentioned endwise movements, the rack tilting movement being about the mentioned axis and about the parts gear portions without movement of the parts thereby allowing the parts to dwell in advance of and supplement to the dwell period of the element and member while the member is at the mentioned material feeding station.

21. In a sheet metal press feed having a frame, a feed member, bearing means on the frame in movable engagement with the feed member for supporting the same for movement between two positions, a pair of work blank engaging fingers, and bearing means on the member and in movable engagement with each finger for supporting the same in spaced relation to and for movement toward and away from the other to thereby engage and disengage a work blank; the combination therewith of movable means for reciprocating the feed member including a rotatable gear part on the frame operatively connected to the feed member and a freely tiltable rack part in poise on and in mesh with the gear part, a second movable means for moving the fingers and including a Geneva wheel operatively connected to the fingers and to the first named movable means at a point in the power transmission through the first named movable means in advance of the position therein of the rack part, and power exerting means on the frame in engagement with the first named movable means for moving the same whereby the fingers are moved apart and then moved toward each other in the course of the member movement to one position and then to the other position.

22. In a machine for forming material having a frame, a pair of material forming components supported on the frame for relative movement towards each other to a position of engaging material and thus to form material between the components and for movement away from each other to a position of disengaging material and thus to permit formed material to be shifted or unformed material to be placed between the components, power transmission means on the frame in engagement with the movable of said components for moving the same, a member supported on the frame for movement to and from a position between the components, means in engagement with the member and the frame for moving the member, and means on the member for engaging material and movable relative to the member to and from a position of material engagement; the combination therewith of a means in operative engagement with the material engaging means and with the movable material forming component for transmitting the motion thereof to the material engaging means to move the same relative to the member and to the material engaging position of the material engaging means when the movable component approaches the other component; the material engaging means including a pair of opposed finger parts supported on the member for movement toward each other to engage material and away from each other to disengage material and the means in operative engagement with the material engaging means including a Geneva gear supported for rotation on the frame and operatively connected to the finger parts whereby the finger parts move toward each other when the Geneva gear is rotated in one direction and move away from each other when the Geneva gear is rotated in an opposite direction.

23. A machine for forming material described in claim 22 in which the therein mentioned means in operative engagement with the material engaging means also includes a wiper crank arm supported for rotation on the frame to engage the Geneva gear in such rotation when the movable component moves.

24. A machine for forming material described in claim 23 in which the therein mentioned means in operative engagement with the material engaging means further includes a shaft keyed to the wiper crank arm and rotatably supported on the frame, a pair of pinions on and in keyed engagement with the shaft, a rack bar in engagement with the movable material forming component and in mesh with one of the pinions, a second rack bar in slidable engagement with the frame and in mesh with the other pinion and operatively connected to the member whereby the movement of the movable component is transmitted through the shaft to both the member and the material engaging means.

25. In a sheet metal press having a frame, a bed on the frame, a material forming plunger supported on the frame for slidably reciprocable movement toward and away from the bed, means on the frame and in operating engagement with the plunger for reciprocating the plunger, a feed member, bearing means in engagement with and extending across the bed in slidable engagement with the feed member for supporting the same for reciprocation to and from a position between the plunger and bed, a pair of work blank engaging fingers, and bearing means on the feed member and in slidable engagement with the fingers for supporting each in spaced relation to and for reciprocation toward and away from the other to thereby engage and disengage a work blank; the combination therewith of a means for moving the feed member including a gear part rotatably supported on the frame and operatively connected to the feed member and a freely tiltable rack part in poise on and in mesh with the gear part, means in engagement and movable with the plunger and operatively connected to and in pivotal engagement with one end of the rack part whereby the rack part is moved relative to the gear part by and only upon movement of the plunger relative to the bed, and means for moving the fingers, including a Geneva wheel, operatively connected to the fingers and to the feed member moving means whereby the fingers are actuated by the plunger moving relative to the bed to move apart and towards each other in time with the feed member movement.

26. In a machine for forming material having a frame, a pair of material forming components supported on the frame for relative movement towards each other to form material between the components and for movement away from each other to permit unformed material to be placed between the components, power transmission means on the frame in engagement with the movable of the components for moving the same, a member supported on the frame for movement to and from a position between the components, and means on the member for engaging material and movable relative to the member to and from a position of material engagement, the combination therewith of means in operative engagement with a movable of the components and with the member and the material engaging means for transmitting the motion of the movable material forming component as the same approaches the other component to the member and to the material engaging means to move the member to a position between the components, to move the material engaging means from a material engaging position and to move the member from a position between the components, the last named means including a rack bar in engagement and movable with the movable component, a gear on the frame and mounted for rotation in mesh with the rack bar, a second gear, a shaft on the frame and being keyed to the second gear to support the second gear in mesh with the first gear, a wiper crank arm keyed to the shaft, a Geneva gear, a Geneva shaft on the frame and in keyed engagement with the Geneva gear to support the same for engagement with the wiper crank arm on rotation of the first named shaft and adapted on such engagement to rotate the Geneva gear and shaft, gear means operatively connecting the Geneva shaft to the material engaging means whereby rotation of the Geneva shaft in one direction actuates the material engaging means to engage material and rotation of the Geneva shaft in the opposite direction actuates the material engaging means to disengage material, a pinion in keyed engagement with the first named shaft, a slide bar having rack teeth, a slide bearing on the frame in slidable engagement with the slide bar for supporting the same for lineal reciprocation in mesh with the pinion, a rack part pivotally connected at one of its ends to the slide bar, a drive shaft journalled on the frame in spacial relation of a distance less than the length of the rack part from the path through which the end of the rack part pivotally connected to the slide bar moves when the slide bar reciprocates, a gear part rotatably supported on the drive shaft in mesh with the rack part, a clutch element on and keyed to the drive shaft, means on and in engagement with the drive shaft and with the member for actuating the member to move to and from a position between the components on rotation of the drive shaft, the gear part having means in engagement therewith to engage the clutch element and rotate the same when the gear part rotates.

27. In a sheet metal press having a frame, a bed and a material forming plunger supported on the frame for reciprocable movement toward and away from the bed, means on the frame in operating engagement with the plunger for reciprocating the plunger, a feed member, bearing means on and extending across the bed in slidable engagement with the member for supporting the same for reciprocation to and from a position between the plunger and bed, and means on the member for engaging a work blank; the combination therewith of means for moving the member including a pair of gear parts, a latch movably supported on each gear part, a pair of rack parts, each one of the pair of rack parts being in poise on and in mesh only with a different one of the pair of gear parts and having one end operatively connected to the plunger, bearing means on the frame in engagement with each gear part for supporting the same for rotation about an axis spaced from the path of movement of the plunger connected end of the rack part meshing therewith and each of the opposite ends of that path a distance less than the length of the rack part meshing therewith and less the length of the mentioned path whereby the rack parts move with and in response to plunger movement to cause each gear part to first rotate in one direction opposite to that in which the other gear part rotates and to then rotate in the other direction in each stroke of the plunger the gear and rack parts having a gear ratio so that the rotations of both gear parts in the same direction during a stroke of the plunger exceeds 180° and is less than 360°, and a rotatable element having two pairs of cogs, each cog of each pair of cogs being circumferentially spaced 180° about the axis of rotation of the element from the other of the pair and spaced a number of degrees from a cog of the other pair less than the number of degrees which the rotations of both gear parts in the same direction in one stroke of the plunger exceeds 180°, the element being supported for rotation on the frame in a position so that each latch engages one pair of cogs on rotation of the gear part and when rotated in the one direction engages a cog to rotate the element with the gear part.

28. In a sheet metal press having a frame, a reciprocable plunger on the frame, a plurality of die stations in spaced relation on the frame, a member on the frame movable across the die stations and the space therebetween and a plurality of work blank engaging devices on the member; the combination therewith of a means for moving the member including a crank operatively connected to the member, a shaft bearing for rotation on the frame and keyed to the crank, a clutch element keyed to the shaft and having an axially extending rim flange, the flange having two substantially 180° circumferentially extending aligned tracks on its inner surface, each track terminating in a cog, a second clutch element on and rotatable relative to the shaft in nesting relation to the flange, a biased latch on the second clutch element in a position upon rotation thereof in one direction to engage a cog, a pinion part on the second clutch element, a rack part in poise and mesh with the pinion part, a slide bar in slidable engagement with the frame for reciprocatory movement along a path parallel to a line coinciding with the axis of the shaft and extending for a distance from one to the other side of a second line coinciding with the axis of the shaft at right angles to the first mentioned line, one end of the rack part being pivotally connected to the bar whereby movement of the bar moves the rack part endwise first in one direction and then in the opposite direction to rotate the pinion part first in a direction causing latch and cog engagement and next in a direction causing latch and cog disengagement whereby the member is alternately actuated to move and to dwell, and means in engagement with and operatively connecting the bar and plunger whereby a reciprocatory movement of the plunger causes like movement of the bar.

29. The combination described in claim 28 in which the rim flange has two additional substantially 180° circumferentially extending aligned tracks on its inner surface, each of the last named tracks terminating in a cog circumferentially spaced from one of the first named cogs substantially one degree, a third clutch element on and rotatable relative to the shaft in nesting relation to the flange, a second biased latch on the third clutch element in a position so that rotation of the third clutch element in one direction effects engagement between the latch and a cog, a second pinion part on the third clutch element, a second rack part in poise and mesh with the second pinion part, a second slide bar in slidable engagement with the frame for reciprocatory movement along a path parallel to and on the other side of the first named line from that side on which the path of the first named slide bar is, the path of the second slide bar extending for a distance from one to the other side of the second line, one end of the second rack part being pivotally connected to the second slide bar whereby movement of the second slide bar moves the second rack part endwise first in one direction and then in the opposite direction to rotate the pinion part on the third clutch element first in a direction causing disengagement of the second latch and one of the second named cogs and then in a direction causing engagement of the second latch and one of the second named cogs, and means in engagement with the second slide bar operatively connecting the second slide bar to the means connecting the first named slide bar to the plunger whereby reciprocatory movement of the plunger causes coincidental and like movement of the slide bars.

30. The combination described in claim 29 in which both gear parts have the same pitch diameter and the paths of movement of the two slide bars are of equal length and extend equal distances on each side of the mentioned second line, the distance that the paths extend on one side of the mentioned second line being equal to the distances that the paths extend on the other side of the mentioned second line less the pitch diameter of the gear parts.

References Cited in the file of this patent
UNITED STATES PATENTS

| | | |
|---|---|---|
| 820,357 | Hodgson | May 8, 1906 |
| 1,422,605 | Needham | July 11, 1922 |
| 1,497,001 | Rotherham | June 10, 1924 |
| 1,626,977 | Sibley | May 3, 1927 |
| 2,694,497 | Stock | Nov. 16, 1954 |
| 2,744,751 | Janz | May 8, 1956 |
| 2,757,569 | Isom | Aug. 7, 1956 |
| 2,851,979 | Chatfield | Sept. 16, 1958 |